(12) United States Patent
Benedict et al.

(10) Patent No.: US 7,931,431 B2
(45) Date of Patent: *Apr. 26, 2011

(54) AUTOMATED MATERIAL HANDLING SYSTEM WITH LOAD TRANSFER VEHICLES

(75) Inventors: Charles E. Benedict, Tallahassee, FL (US); Brian G. Pfeifer, Tallahassee, FL (US); Christian A. Yates, Tallahassee, FL (US); Scott K. Bladen, Bristol, FL (US); James R. Dobbs, Tallahassee, FL (US)

(73) Assignee: BEC Companies, Inc., Tallahassee, FL (US)

( * ) Notice: Subject to any disclaimer, the term of this patent is extended or adjusted under 35 U.S.C. 154(b) by 1064 days.

This patent is subject to a terminal disclaimer.

(21) Appl. No.: 11/515,380

(22) Filed: Sep. 5, 2006

(65) Prior Publication Data

US 2007/0065258 A1 Mar. 22, 2007

Related U.S. Application Data

(63) Continuation-in-part of application No. 10/429,784, filed on May 6, 2003, now Pat. No. 7,101,139.

(51) Int. Cl.
*B65G 1/00* (2006.01)
(52) U.S. Cl. ...................... 414/281; 414/137.1; 280/755
(58) Field of Classification Search ............... 414/137.1, 414/137.5, 138.8, 139.4, 139.9, 143.2, 281, 414/673, 719; 280/755; 180/7.1
See application file for complete search history.

(56) References Cited

U.S. PATENT DOCUMENTS

| | | | | |
|---|---|---|---|---|
| 2,612,238 | A | 9/1952 | Angelicola | 187/270 |
| 3,743,116 | A | 7/1973 | Giessler et al. | 414/279 |
| 3,972,500 | A * | 8/1976 | Johnson et al. | 410/85 |
| 4,279,563 | A | 7/1981 | Miller | 414/611 |
| 4,345,658 | A * | 8/1982 | Danel et al. | 180/8.5 |
| 4,612,996 | A | 9/1986 | Wolf et al. | 172/26 |
| 4,637,494 | A | 1/1987 | Iida et al. | 104/288 |
| 4,641,757 | A | 2/1987 | Rosendale | 212/312 |
| 4,764,078 | A | 8/1988 | Neri | 414/273 |
| 4,865,155 | A | 9/1989 | Montaigne et al. | 182/14 |
| 5,215,427 | A * | 6/1993 | Olsthoorn et al. | 414/664 |
| 5,395,199 | A | 3/1995 | Day et al. | 414/267 |
| 5,433,293 | A | 7/1995 | Sager | 187/249 |
| 5,453,931 | A | 9/1995 | Watts, Jr. | 701/23 |
| 5,464,082 | A | 11/1995 | Young | 191/2 |
| 5,501,295 | A * | 3/1996 | Muller et al. | 187/406 |
| 6,049,745 | A | 4/2000 | Douglas et al. | 701/23 |
| 6,309,162 | B1 * | 10/2001 | White | 414/273 |
| 6,393,335 | B1 | 5/2002 | Ostwald | 700/214 |
| 6,394,738 | B1 * | 5/2002 | Springer | 414/673 |
| 6,668,950 | B2 | 12/2003 | Park | 180/7.1 |
| 7,155,307 | B2 * | 12/2006 | Seemann | 700/245 |
| 2002/0036108 | A1 * | 3/2002 | Jeswine et al. | 180/7.1 |

* cited by examiner

*Primary Examiner* — Michael S Lowe
(74) *Attorney, Agent, or Firm* — Dowell & Dowell, PC

(57) ABSTRACT

A material handling system for use in storing and moving goods within multi-level storage warehouses, ocean going vessels and the like wherein storage areas are provided on at least one of the levels and wherein goods are automatically transferred to and from the storage areas and between the various levels by self-propelled load transfer vehicles. The load transfer vehicles move across the surface of the various levels and are also movable under their own power within open vertical trunks between the levels to thereby move goods to any desired area within the system, warehouse or vessel.

25 Claims, 21 Drawing Sheets

Bin Layout in Storage Hold

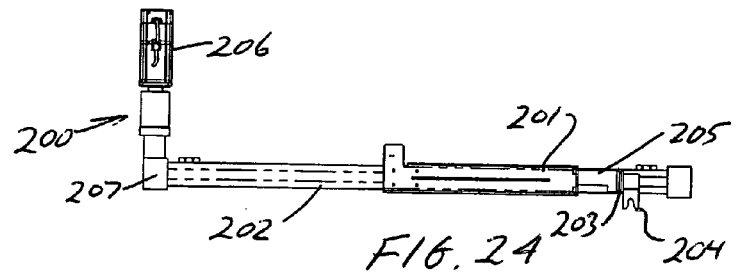
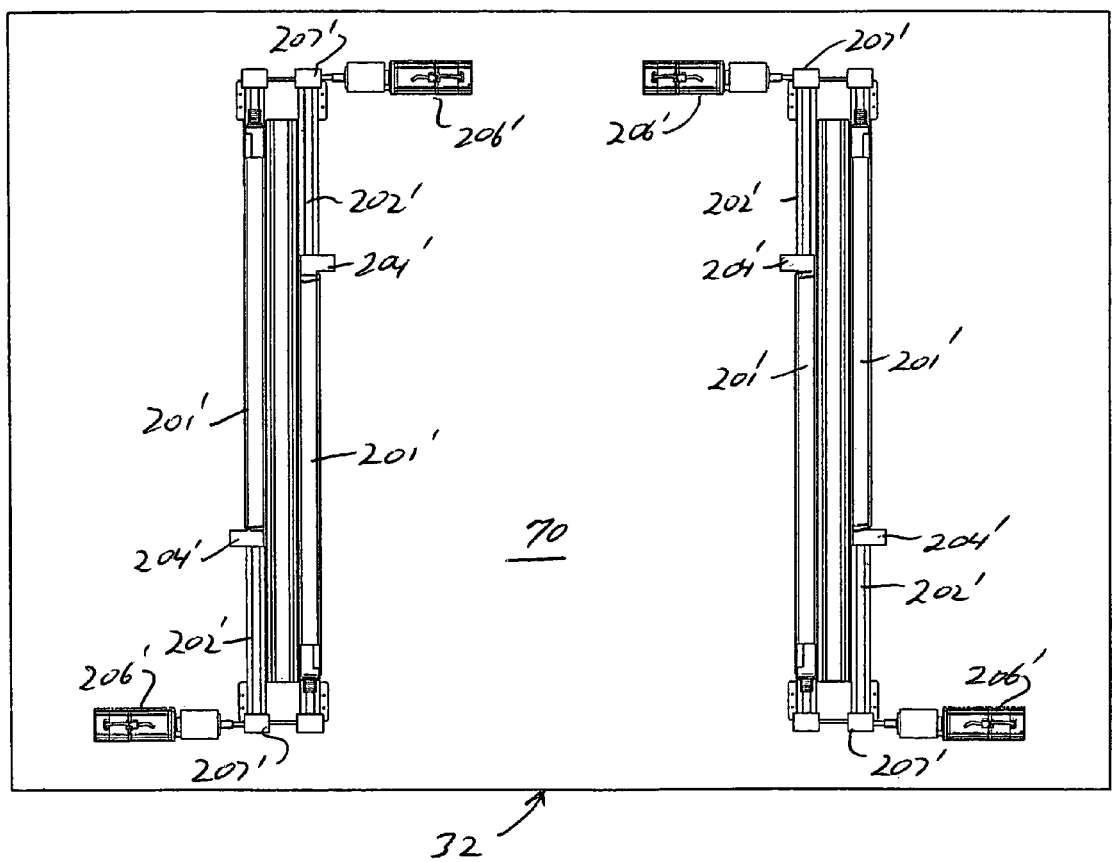

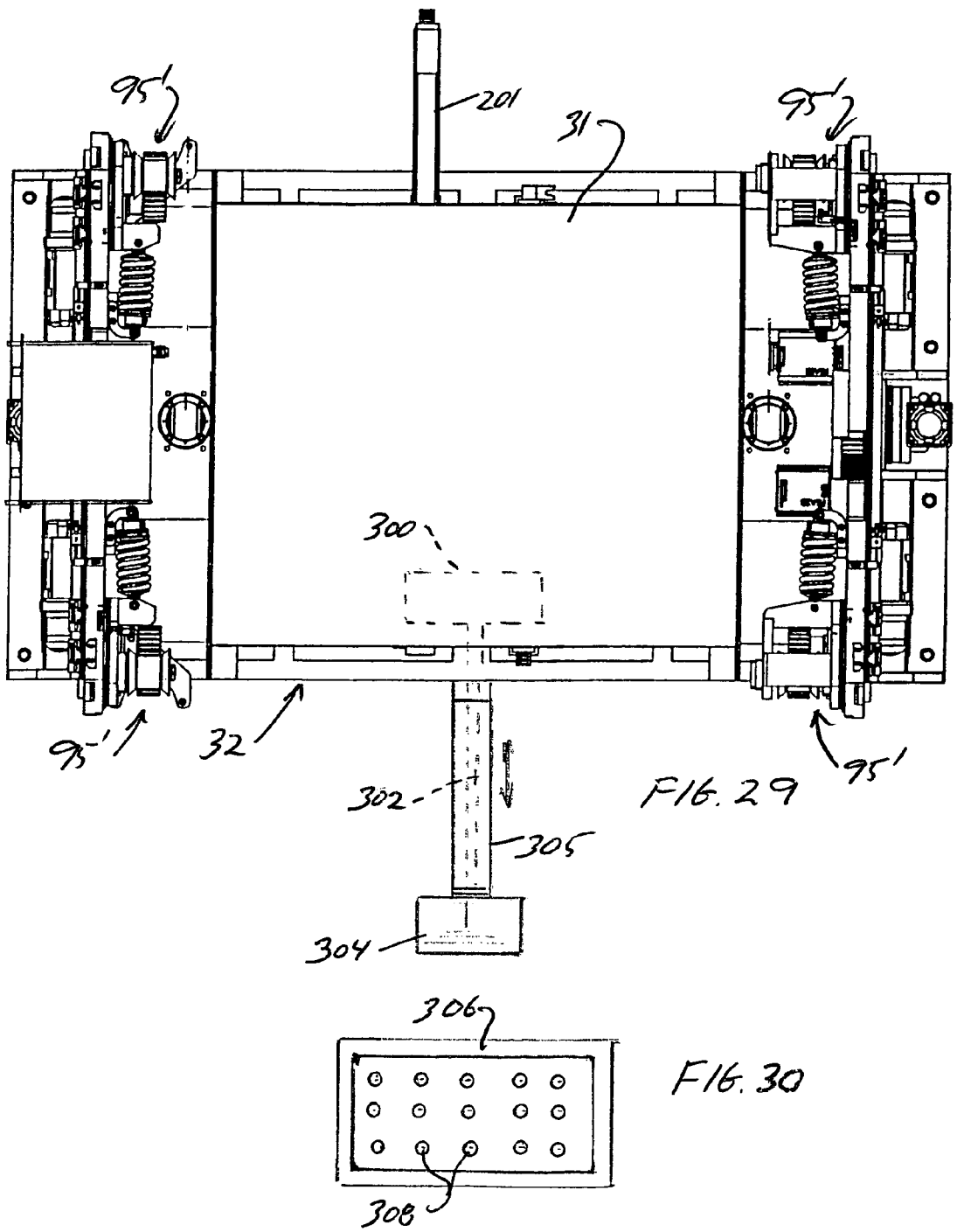

AUTOMATED MATERIAL HANDLING SYSTEM WITH LOAD TRANSFER VEHICLES

CROSS REFERENCE TO RELATED APPLICATIONS

This application is a continuation-in-part of co-owned U.S. application Ser. No. 10/429,784, filed May 6, 2003, entitled Automated Material Handling System With Motorized Transfer Vehicles.

BACKGROUND OF INVENTION

1. Field of the Invention

The present invention is directed to automated material and article handling systems which can be used in any multi-level warehouse, storage and/or distribution environment, including ocean going vessels, such as naval ships. Each system includes a plurality of vertically spaced levels where goods are either stored, delivered to or taken from, or temporarily positioned. In some systems, one or more levels may be designated as goods receiving and storage levels, such as in cargo holds of ships, in which goods or cargo may be selectively stored, sometimes in vertically and horizontally spaced bins, racks or shelves. In preferred embodiments, the goods are carried on pallets that are moved by self-loading and unloading powered load transfer units or vehicles that maneuver the multiple levels and that also travel upwardly or downwardly relative to the levels or decks within vertically open trunks or shafts. In this manner, goods may be delivered to and from the storage areas at one or more levels or decks and distributed automatically therefrom to selected areas of any of the levels that communicate with the vertical trunks.

2. Brief Description of the Related Art

In material and article handling systems conventionally used in warehouse and distribution centers, storage facilities as well as on ocean going vessels, various goods including supplies, spare parts, dry goods, general merchandise, munitions and the like are normally loaded into the storage areas of the facility or vessel utilizing forklifts, gantry type elevators, special cranes, hoists and the like which raise and lower the items between various levels or decks. In such systems, it is also necessary to provide load transferring devices, such as special trucks or fork lifts, at each of the levels to move goods relative to elevators or hold areas where the goods are initially off-loaded utilizing the above referenced loading equipment. When any item is needed from storage, the same equipment which is utilized for initially storing the item is used to retrieve the item. In some storage environments, such as on ships, goods from storage must often be moved between various levels or decks thus requiring not only equipment to be available in the area of storage bins, but also requiring similar equipment at each deck level where the goods are to be distributed. Further, elevators are required between the levels or decks.

The above conventional material handling systems are very labor intensive and costly to maintain. In facilities having multiple storage floors and on ocean going vessels having multiple decks, the use of multiple load carrying vehicles or machinery at different levels increases not only the number of workers or crew members necessary to effectively distribute goods but also requires duplication of equipment at each level for maneuvering large, heavy and bulky items.

In view of the foregoing, there is a need to provide for an enhancement in the handling and storage of goods in multi-level storage systems, warehouses and distribution environments and especially in environments such as ocean going vessels. Material and article handling systems are needed which will reduce the number of workers or crew members which must be dedicated to the movement and storage of goods and which also will reduce the number of load carrying and maneuvering vehicles and other equipment which is necessary to effectively store and distribute goods and equipment in such systems or vessels.

SUMMARY OF INVENTION

The present invention is directed to automated material and article handling systems for use in multi-level warehouses, distribution centers and/or storage areas and which systems are particularly adapted for use in ocean going vessels. The material and article handling systems include load or article transfer units or vehicles which are powered and moveable both along floor or deck areas, such as within a hold storage area of a ship, and which are also independently vertically moveable between levels or decks. The vehicles are designed to move within special open vertical shafts or trunks so that goods, supplies and equipment can be transported to vertically spaced areas without requiring separate loading, hoisting and unloading equipment on each level or deck, as is the case with conventional material and article handling systems.

With the present invention, each of the load transfer units or vehicles has a first drive system which allows generally universal or omni-directional movement of the vehicles across horizontal levels, such as floors and decks, such that the vehicles may be maneuvered relative to storage bins which are provided in horizontally and vertically spaced arrangements within storage areas. Further, first motors or drive mechanisms associated with the first drive system may be manually or remotely controlled or subject to on-board programmable controllers associated with each vehicle. In some embodiments, the transfer vehicles may be self-loading and/or off-loading so that goods may be placed into or removed from storage bins without worker or crew member effort.

In some embodiments of the invention, the omni-directional movement of vehicles is obtained by providing drive rollers, wheels or tracks in spaced relationship beneath the vehicles which are separately powered such that they may be driven in opposite relationship with respect to one another to create a turning effect so that the vehicles may be maneuvered in a 360° manner relative to the surface over which they travel.

In other embodiments, the vehicles may be mounted about a center support so that a load carrying platform associated with each vehicle may be rotated substantially 360°. In other embodiments, the vehicles may be supported on special carriage members which include rollers supported in tracks above or below a floor or deck surface or on low friction skids which are slidable along low friction guide channels. The tracks or channels provide a positive guide for the vehicles when moving potentially hazardous goods or cargo and may be particularly advantageous for use on ships. By guiding the vehicles in a track system, it is possible to ensure that the vehicles are positively guided, at all times, regardless of any change in pitch or roll of a ship at sea.

In some systems, guide wires or other devices may be placed within floor or deck areas for providing a guidance system for controlling movement of the vehicles. In other systems, Global Positioning System (GPS) devices may be associated with each vehicle to provide guidance for movement of the vehicles both horizontally and vertically relative to the multiple levels or decks associated with a system.

The load transfer vehicles may also be remotely controlled so as to allow information to be provided to on-board control units associated therewith. Information will be provided to direct a vehicle to and from loading and storage areas including information as to where goods are to be loaded or delivered, thereby completely freeing each load transfer vehicle from worker or crew member input at a point of loading, during transport to storage or during distribution from storage. Input systems may also be used such as bar codes, RF tagging systems and other readers which scan labels or tags on goods being initially loaded onto a transfer unit or vehicle for conveying to storage. Preprogramming of the units can provide guidance to each transfer vehicle with respect to the movement or destination of specific goods loaded thereon based upon information received from scanning of the labels or tags when goods are loaded and/or from a central computer system which is in communication with each transfer vehicle.

Each load transfer vehicle is also provided with a second drive system which includes deployable gears or pinions that are engageable with vertical racks or similar elements which are mounted so as to extend between floors or deck levels of a storage facility, warehouse or ship. In this manner, the vehicles may be maneuvered vertically without the need for lifting machinery such as cables, hoists, or pneumatic or hydraulic lifts. In one preferred embodiment of the present invention, the second drive system includes vertical drive pinions that are extended and retracted by suitable hydraulic, pneumatic or mechanical members relative to each corner of a vehicle such that the pinions are engageable with vertical gear racks that are mounted adjacent each of the four corners of each trunk or shaft. In some embodiments, the vertical racks may be mounted diagonally at the corners of the trunks. The pinions are powered by one or more second drive motors that are drivingly connected thereto so that of the pinions are rotated simultaneously at the same speed in either a first rotational direction to move a vehicle upwardly within a trunk or a second reverse direction to move the vehicle downwardly within a trunk.

To permit the vehicles to be elevated above a top floor or deck of a system, upper sections of each of the vertical gear racks are movably mounted to a bottom surface of at least two cooperating hatch covers or doors that normally are closed in sealing relationship at the open top of each trunk or shaft. In one embodiment as a vehicle approaches the bottom of the hatch doors, the vehicle will engage one or more levers that will pivot the hatch doors upwardly to positions not to obstruct the hatch opening and so that the hatch doors are aligned vertically and parallel with the adjacent gear racks. At this time, drive mechanism are used to move the upper sections of the gear racks downwardly to mesh with and engage the upper ends of the gear racks immediately below the upper surface or deck. The doors or hatch covers may also be opened by sensors operatively connected to mechanisms to open and close them. With the doors raised and the upper rack sections lowered, the load transfer vehicles may be raised so as to be self-loading or off-loading relative to the top floor or deck surface. Upon lowering of the transfer vehicles within one of the trunks. The doors are subsequently closed so as to be substantially flush with the surface of the upper floor or deck. Mechanical supports are also provided on each hatch door to reinforce the doors for supporting the weight of the vehicles.

In some embodiments, each transfer unit or vehicle may also include a third drive system for moving the vehicle into or out of the trunks or shafts through access openings provided at each level. At each access opening, a plurality of platforms are provided that function as extensions of the adjacent floor or deck surface and extend into the trunks so as to provide only a minimum clearance to permit passage of a vehicle along the trunk. If a vehicle is to exit a trunk at a selected access opening, the vehicle is stopped and third drive members are extended outwardly from the vehicle to engage the platforms. In preferred embodiments, the platforms on opposite sides of a vehicle may include grooves in which the drive members will engage so that the grooves provide positive guidance for the vehicle through an access opening. As the third drive members approach one of the corner gear racks, they will be automatically retracted from their deployed position to allow passage of the vehicle through the access opening. After the vehicle begins exiting the trunk, one or more of the first drive members will propel the vehicle the remainder of the distance from the trunk. The third drive members are driven by one or more power sources, such as electric motors, such that they rotate at a uniform velocity. In preferred embodiments, the third drive members are normally housed within the vehicle but are selectively deployed when needed to engage the platforms when entering or exiting a trunk.

In other embodiments, as opposed to the transfer vehicles including third drive members and as opposed to providing the plurality of platforms, a single vehicle support platform will be provided at each access opening into a trunk. The single support platforms are normally pivoted vertically upwardly so as to form a safety barrier to prevent accidental entry into the trunk but are selectively lowered to create a support structure on which one of the vehicles may be driven under the power of it's first drive members such that the vehicle is easily driven into or out of the trunk. In some embodiments, the support platform may function as a door to an access opening, however, in other embodiments, separate doors as conventionally used in elevators or on ships will be used in combination with the support platform.

Because of their need to move vertically in both ascending and descending manners, each of the load transfer vehicles of the present invention includes appropriate braking devices for slowing and/or preventing movement within the vertical trunks. Various types of braking mechanisms may be used either as separate mechanical devices or anti-backdrive gears may be associated with the drive motors of the transfer units or vehicles that prevent any non-desired movement of the motor drive shafts. Automatic brakes may be provided to prevent movement of the vehicles in the event of loss of motive power when the vehicles are traveling in the vertical trunks, even when carrying substantially heavy loads.

In accordance with a preferred embodiment of the present invention, the transfer vehicles will receive operating power for operating motors of the various drive systems and control elements associated therewith by special electrical raceways or enclosed inductive power transfer (IPT) conductors that extend along at least one vertical side of each trunk and that are connected to a suitable source of electrical power supply. Electrical collectors on each vehicle will be deployable once a vehicle has entered a trunk to receive power. The power is also used to charge on-board batteries. Appropriate connections are also provided on each vehicle to allow electrical charging of batteries when the vehicles are not in use. In addition, the second drive members may be connected to at least one on-board generator which may be provided within each vehicle. Each generator is connected so as to charge the on-board batteries as the transfer vehicles move within the trunks.

In addition to the provision of the gear racks associated with the trunks of the invention, the bins within the storage levels or decks of a system may also include racks which extend vertically between the storage bins such that each transfer vehicle may also be elevated with respect to a series of vertically spaced storage bins. In such systems, the spacing of the bins in rows is such as to allow the first drive pinions to engage bins on opposite side of an aisle to permit vertical movement of the vehicles relative to the storage bins.

In other embodiments of the present invention, one or more of the load transfer vehicles may incorporate elevating, loading or discharge mechanisms which are mounted thereto for purposes of moving goods carried on pallets to or from storage bins. Such handling equipment may include forklift type elements which are movably mounted with respect to the transfer vehicles both horizontally and vertically. To provide for stability, when such load handling equipment is mounted to one of the transfer vehicles, appropriate outriggers or other stabilizing elements are provided which may be deployed outwardly relative to the vehicles so as to offset any force created that would otherwise tend to tip one of the vehicles. In some environments, such as on ships having metallic flooring, such stabilizing devices may include electromagnetic devices or suction devices carried by the outriggers or locking devices that engage within channels, keyways or slots in the deck.

It is the primary object of the present invention to provide an automated material and article handling system which can be used effectively in any type of warehousing, storage, distribution and/or cargo storage system which incorporates a plurality of vertically spaced levels and wherein goods are stored on designated levels and distributed to other levels and which is uniquely adaptable to warehouses and ocean going vessels, including naval ships, for storage and distribution of goods, supplies and equipment in such a manner as to reduce required manual involvement and duplication of equipment when compared to conventional storage and handling systems.

It is a further object of the present invention to provide automated material and article handling systems wherein self-propelled or powered load transfer vehicles are used to transport, store, retrieve and distribute goods, supplies and equipment relative to a storage area wherein the vehicles are movable both across horizontal surfaces as well as within vertical trunks between levels with the vehicles ascending and descending under their own power.

It is yet another object of the present invention to provide automated material and article handling systems which are particularly adapted for warehouses and ocean going vessels wherein increased safety is achieved by providing systems which allow for self-loading and unloading of transfer vehicles and subsequent movement of goods and equipment to desired locations without manual intervention, other than through manual remote control of the transfer vehicles.

It is also an object of the present invention to provide automated material and article handling systems wherein movement of load transferring vehicles is guided either by providing positive guide tracks which control movement of the vehicles or by providing other types of electronic and remote control including electronic guide wires, lasers or GPS positioning systems so that vehicles can be controlled in their movement from point-to-point, both horizontally and vertically, within a system where goods and/or equipment are stored and distributed.

It is yet another object of the present invention to provide electrically powered load transfer vehicles for use in automated article handling and storage systems wherein the vehicles are powered via electrical inductive power conductors and/or batteries and wherein, the vehicles may include generators for charging on-board batteries when the transfer vehicles move in vertically descending relationship with respect to a plurality of levels of the system such that movement of the vehicles during normal use provides energy for charging of on-board batteries.

BRIEF DESCRIPTION OF THE DRAWINGS

A better understanding of the invention will be had with respect to the attached drawings. In the drawings, the system and transfer vehicles are shown in use in a ship, however, the systems of the invention may be used in other environments. In this respect:

FIG. 24 is a top plan view of a first embodiment of loading mechanism in accordance with the invention;

FIG. 25 is a top plan view of a second embodiment of loading mechanism in accordance with the invention;

FIG. 29 is an illustrational view of one of the vehicles showing the vehicle deploying a pneumatic counter-balance outrigger;

FIG. 30 is a view of the suction head of the outrigger of FIG. 30; and

DESCRIPTION OF THE PREFERRED EMBODIMENTS

As previously noted, the present invention is directed to article handling, storage and distribution systems which are generally fully automated. The systems may be used in substantially any multi-level warehouse, distribution or storage environment including multi-level environments on ocean going vessels. The drawings and description will be described with respect to systems which are shown for use in ocean going vessels, however, the invention is not limited to this environment.

Figure 1:
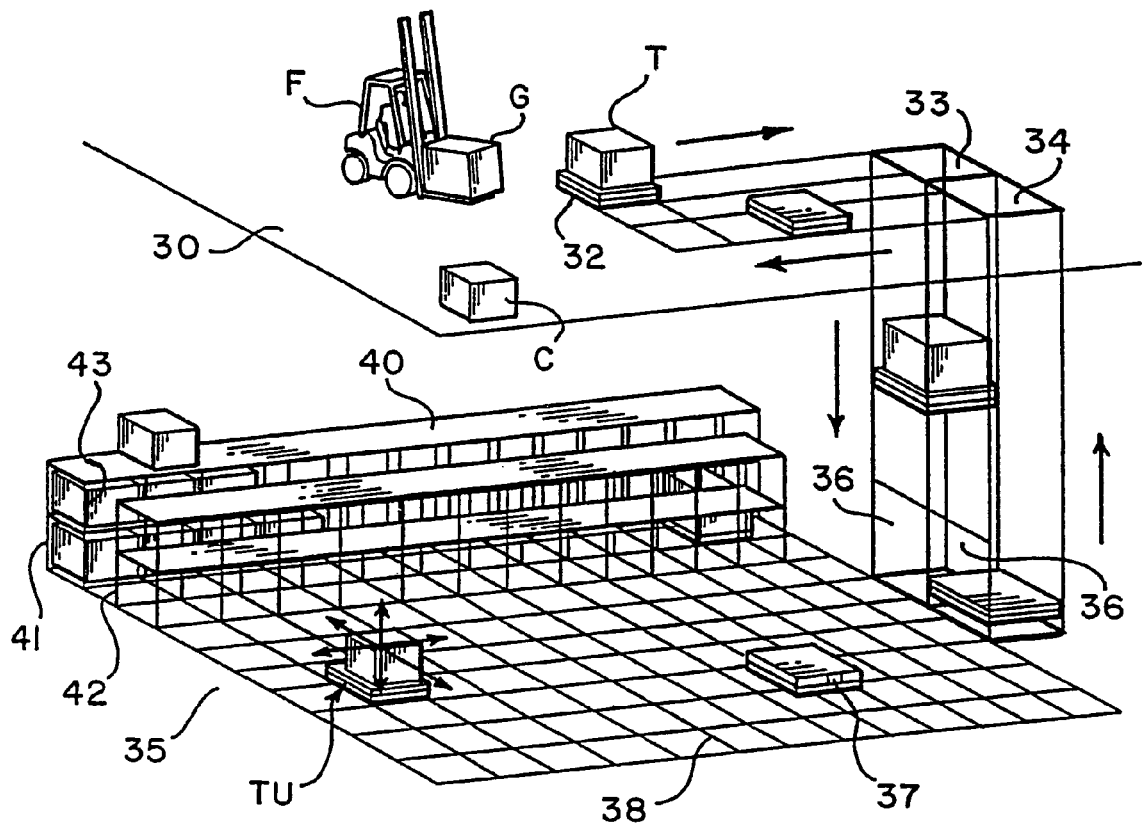
FIG. 1 is schematic illustrational view of an automated material handling and storage system in accordance with the teachings of the invention.
Figure 2:
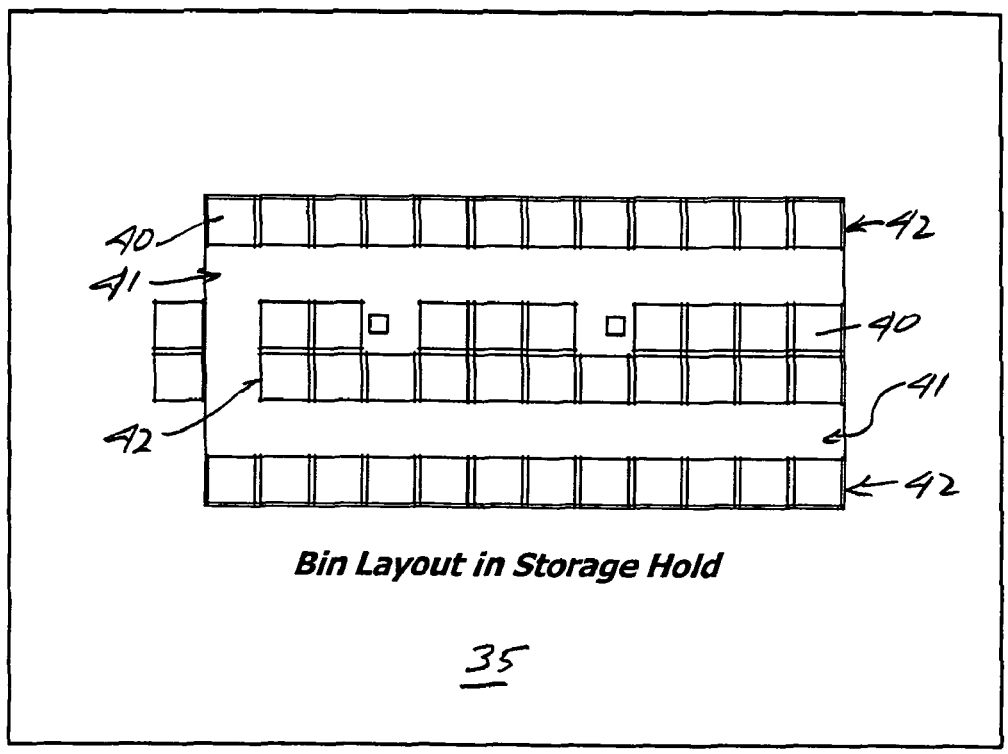
FIG. 2 is a layout of a storage hold showing isle and bin placement.

With specific reference to FIG. 1, a conceptional illustration is disclosed of the basics of the system. The system may be used where items are to be handled and transported between receiving levels or decks and storage levels or decks and the number of levels may vary from two or more. For simplicity of illustration, in FIG. 1, only two levels are shown. The upper level 30 is a receiving level or deck on which various goods "G" are received. The goods may be maneuvered by conventional vehicles such as forklifts "F" and placed on powered transfer units or vehicles 32 of the invention. However, in preferred embodiments of the invention, goods, supplies, parts, munitions and the like are pre-loaded into or on special movable pallets or containers 31, see FIG. 2. The pallets may be supported on wheels, rollers or skids or the like 25 and are designed and constructed to be automatically loaded and off-loaded by equipment carried by the transfer vehicles. As shown in FIG. 2, the pallet includes a lower bracket or bar 26 that by be engaged by equipment on the vehicles to manipulate the pallets as will be described in greater detail hereinafter.

The transfer vehicles are movable along all levels and, in this respect, will be described with the different driving and guidance elements for controlling movement of the transfer vehicles across the various levels or decks of the system. The transfer vehicles are also moveable within generally open vertically extending trunks 33 and 34 which are normally covered, as will be described in greater detail hereinafter, but which are opened to receive the transfer vehicles 32 and to permit the transfer vehicles to exit therefrom. In a ship board environment as shown, the trunks and vehicles are preferably cooperatively designed and constructed such that the vehicles are capable of entering or exiting the trunks in any one of three directions at the storage level 35. However, in some embodiments, entry and exit may only be possible in one or two directions.

As illustrated, once goods or one or more pallets are placed on a transfer vehicle 32, the vehicle is activated to move toward a down trunk 33. The manner in which the vehicles enter the trunk will be described hereinafter. The vehicles are uniquely constructed so as to allow them to descend and ascend within the trunks 33 and 34, respectively, under their own power or by power received from electrical raceways. The vehicles are also provided with their own braking means.

As a loaded transfer vehicle approaches the storage level 35, the unit will egress from an access opening 36 in the trunk onto the surface of the level or deck. The access openings are normally closed by convention elevator doors or other doors 29 associated with elevator type shafts within ships see FIG. 14. As illustrated in FIG. 1, in some embodiments, the transfer vehicles may be guided along floors or decks within tracks in an open channel grid system 37 provided along the surface of the level 35, as illustrated at 38 in the drawings. Similar track or channel guidance systems may be provided along the upper deck in order to provide positive control over movement of the vehicles, especially on board a ship, where the deck surfaces are subject to pitching due to rough seas. To track along such grid systems, the vehicles will have deployable guidance arms that will extend into the tracks such that the arms will cause the vehicles to track along the grid system when moved relative to a floor or deck.

As shown in FIGS. 1-5, a plurality of horizontally and vertically spaced storage bins 40 are provided within the storage area for receiving the goods and pallets carried by the transfer vehicles. The isle spacing 41, between adjacent rows 42, is such as to permit the transfer vehicles to pass there between and in such a manner that, in preferred embodiments, the transfer vehicles will also be able to be elevated by engaging with special tracks or racks provided along the face of each bin as generally illustrated at 43. The tracks or racks 43 provided along the vertical faces of each side of the bins will be identical to those which will be described for use on opposite sides or at the corners of the trunks 33 and 34, which also permit the cooperative engagement of second drive mechanisms associated with each transfer vehicle to control vertical movement, as will be described in greater detail.

When goods are needed from storage or when a transfer vehicle is needed on the upper level receiving area 30, the transfer vehicle 32 enters into the ascending trunk 34, as is illustrated in the drawing figures, and thereafter elevates itself until it reaches the upper deck or level 30. Thereafter, the unit moves under its own power to a point to be loaded or off-loaded with goods, as is illustrated in the drawing figure.

As opposed to the open channels for providing guidance as shown in FIG. 1, the transfer vehicles of the present invention may function as automatic guidance vehicles (AGV) and may be guided by electrical wires placed along the surface of the levels or decks 30 and 35. As opposed to utilizing AGV technology, it is also possible to use GPS positioning technology to control the movement of the vehicles from point-to-point along the surface of any of the levels and within the trunks 33 and 34.

The transfer vehicles may also be in communication with a central computer "C" which tracks the movement of the vehicles, pallets and goods within the storage and distribution system such as by use of on-board transponders and the like 37. In this respect, and by way of example, goods or the pallets being received may include indicia, such as bar codes or RF tags "T", which allow the goods to be identified. This information is received by the transfer vehicles which communicates the information to the central computer. The central computer thereafter determines where the goods are to be placed or stored within one or more specific storage areas of the system, including the specific bin. This information is thereafter provided to the transfer vehicles such that the vehicles are automatically guided to the appropriate storage bins in the appropriate storage areas for purposes of transferring and storing the goods.

In a like manner, when certain goods are required throughout the distribution system, information from the central computer can be transmitted to receivers placed on the transfer vehicles. Such information may direct that specific goods or pallets be taken from specific storage bins and transferred to a specified location at a different or same level of the storage and distribution system.

Figure 6:
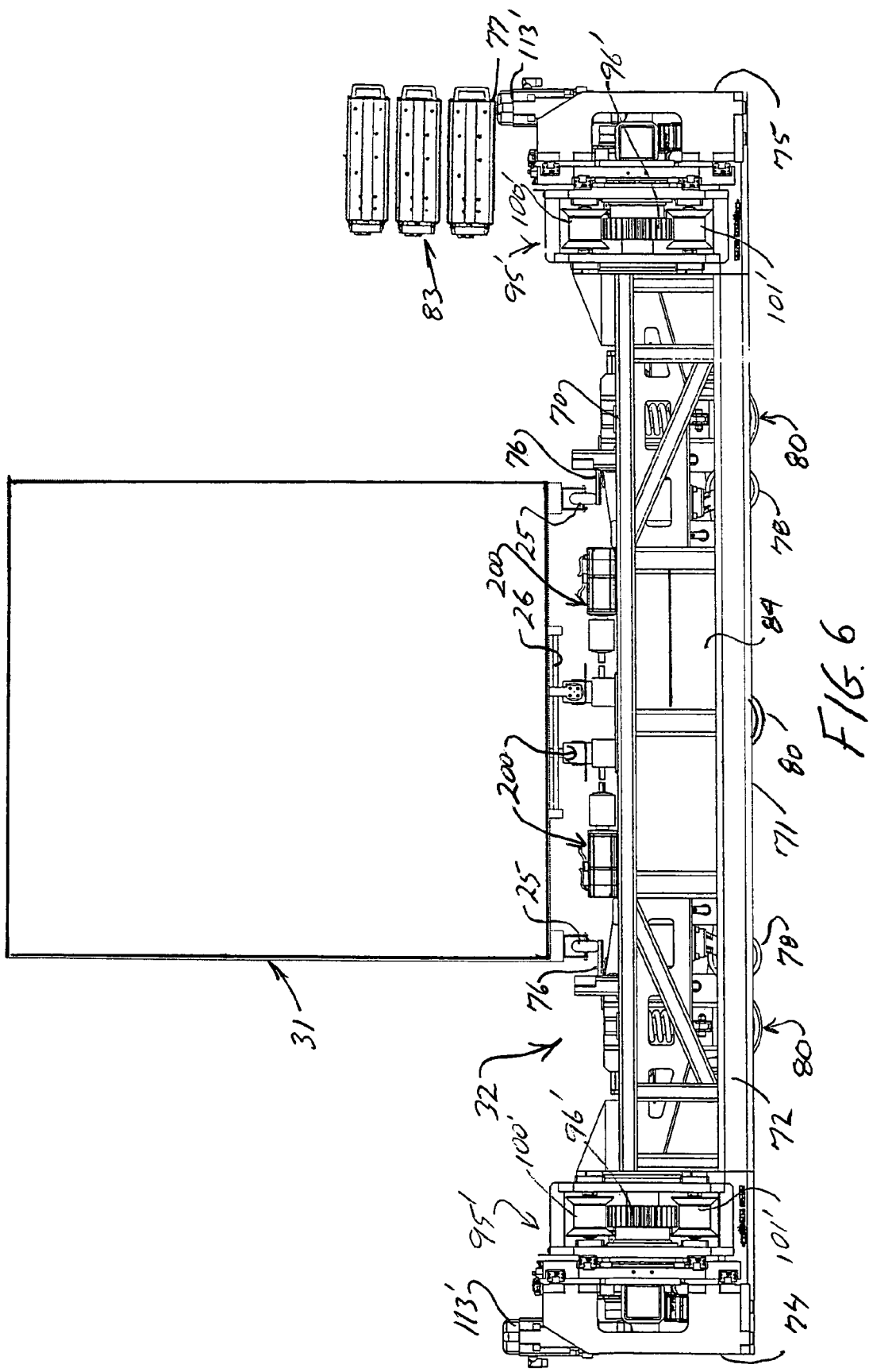
FIG. 6 is a front elevation view of one embodiment of load transfer vehicle of the invention carrying a pallet.

As shown in FIG. 6, in some embodiments the transfer vehicles or units may also include transfer means for automatically discharging or loading goods or pallets to and from the bins 40 so that no additional equipment for handling or maneuvering goods is necessary within a storage area, other than the transfer vehicles. An example of such a transfer means will be described in greater detail hereinafter.

As previously noted, the material handling and storage system of the present invention is uniquely designed to allow for the automated receipt, storage and distribution of goods on a plurality spaced levels of a system using the transfer vehicles 32 to maneuver both along the vertically spaced levels as well as in the trunks 33 and 34 which extend between the levels. Although only two trunks are shown in FIG. 1, any number of trunks may be used in a system.

Figure 7:
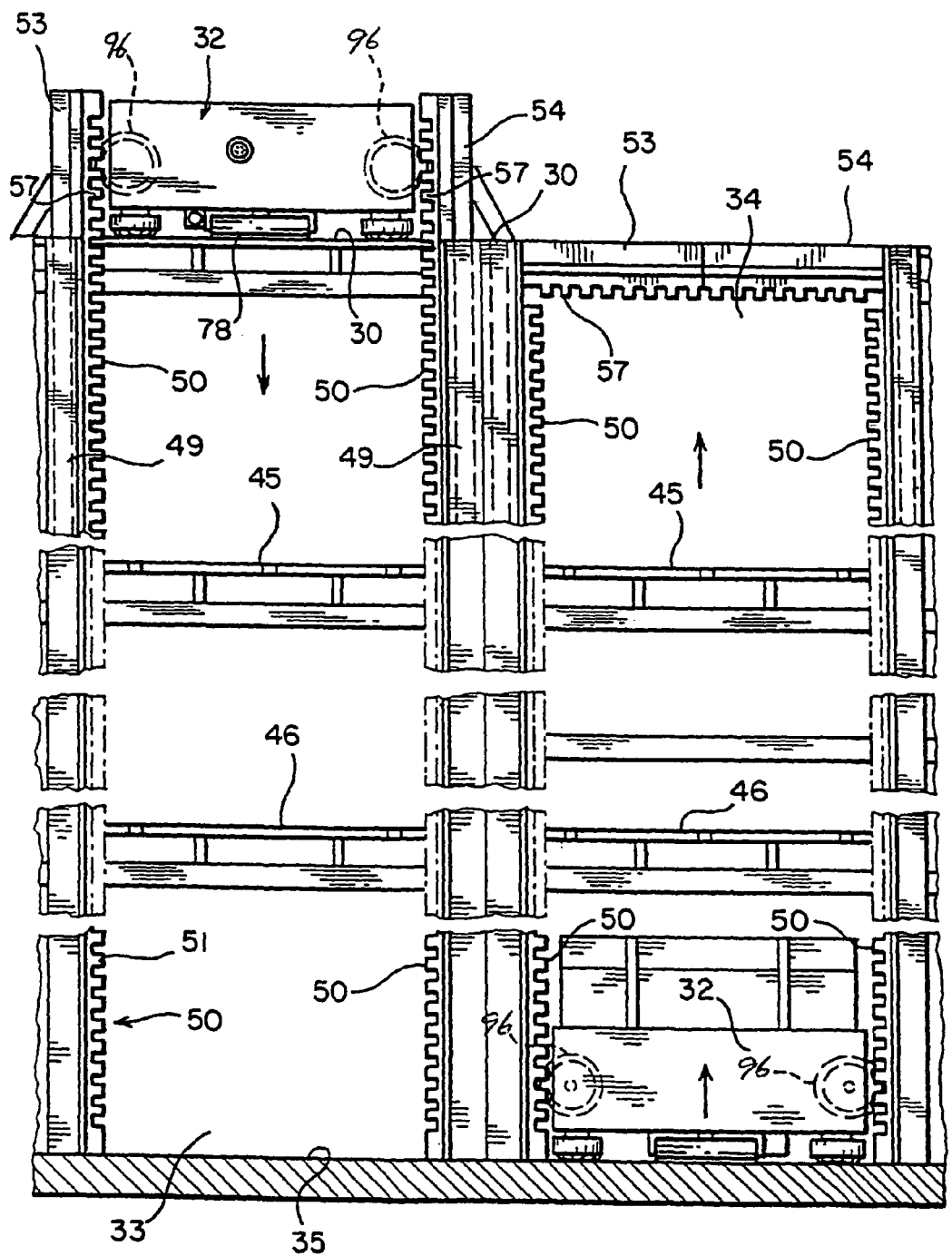
FIG. 7 is an illustrational view taken through two adjacent trunks of the invention and showing doors supporting one of the vehicles of the invention above a descending trunk and showing the doors closed as one of the load transfer vehicles of the invention is moving upwardly to approach the doors.

With respect to FIG. 7, the upper deck or level 30 is shown as being spaced by a plurality of intermediate levels or decks 45 and 46 with respect to the lower storage deck or level 35. Frequently, ten or more decks or levels may be associated with a given system and the number is not limited within the teachings of the invention. In order to allow the transfer vehicles 32 to move vertically through each of the open trunks, it is necessary to provide mechanically engageable elements that extend along the full height of each trunk and along the opposite sidewalls or at the corners thereof. In the embodiments shown, the mechanically engageable elements are in the form of metal racks 50, see FIG. 3, that are rigidly secured to reinforcing steel frame members, such as shown at 49 in FIG. 7.

Figure 8:
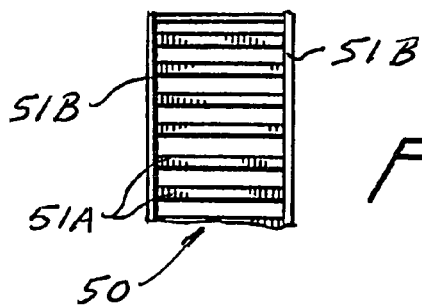
FIG. 8 is a partial view of a section of one of the racks of the invention.

In the embodiment shown in FIGS. 7 and 8, the metal racks 50 having a plurality of vertically spaced teeth 51A extending between spaced vertically extending flanges 51B. The configuration of the teeth 51A and the spacing there between is such as to cooperatively receive intermeshing teeth associated with second vertical drive mechanisms or elements associated with each of the transfer vehicles 32, as will be described hereinafter.

The present invention provides for at least two configuration of racks 50 and second vertical drive mechanisms to permit the vertical movement of the transfer vehicles within the trunks. With specific references to FIGS. 7 and 9, in one embodiment, two separate and spaced vertically extending racks 50 are provided on opposing side walls of each trunk spaced inwardly of the corners thereof so that a total of four vertically extending racks are provided with the racks opposing one another on the opposite walls. For other systems, the racks are preferably placed diagonally at the corners of the trunks, as is illustrated in top plan view in FIGS. 11-13. The corner orientation reduces interference with the movement of the vehicles into and out of the trunks and also allows the racks to be reinforced by steel braces and framing at the corners of the trunks. The vertical drive mechanisms for the side wall racks are somewhat differently configured from the drive mechanisms for the corner racks and both configurations will be described in greater detail hereinafter. The elongated vertical racks are used to receive teeth associated with drive gears or pinions used as drive members for moving the transfer vehicles vertically through the trunks.

Figure 10:
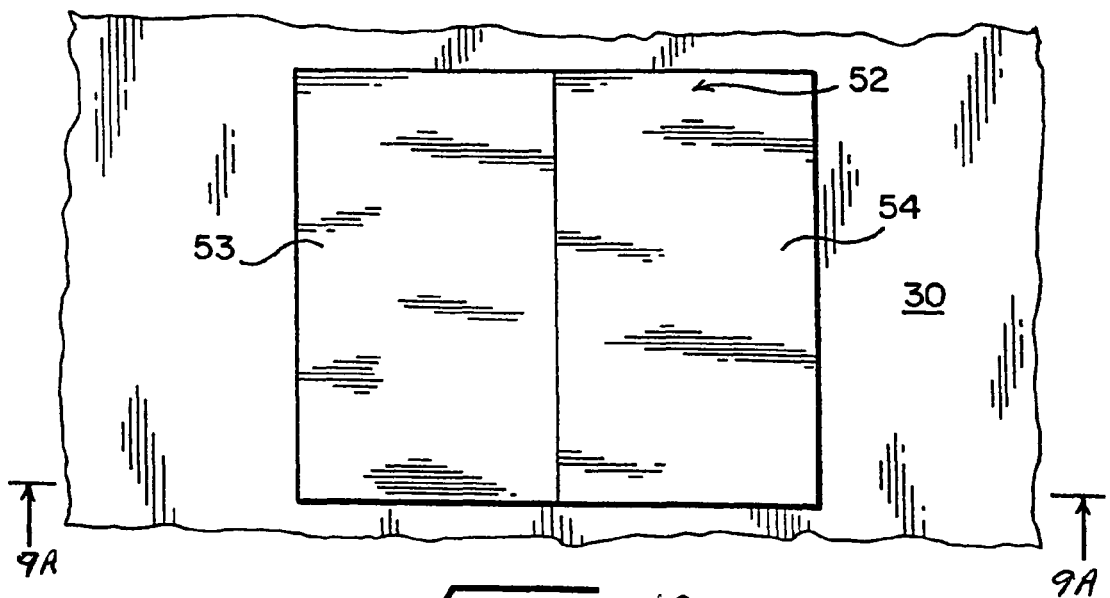
FIG. 10 is a top plan view of the doors covering one of the trunks of the invention.

When the trunks 33 and 34 are not in use, it is important to ensure that the upper hatch openings into the trunks are secured such that the upper floor, deck or level 30 can be used in a conventional manner. With respect to FIG. 10, a top plan view of a pair of closure or hatch members 52 are shown that seal the upper opening into each trunk 33 and 34. It is contemplated that the closure members extend flush with the adjacent surface of the upper deck level or surface 30 when closed. In the embodiment shown in the drawing figures, each closure member 52 is formed of two separately pivotable doors 53 and 54 which are mounted below the level 30 to pivots (not shown).

Figure 9A:
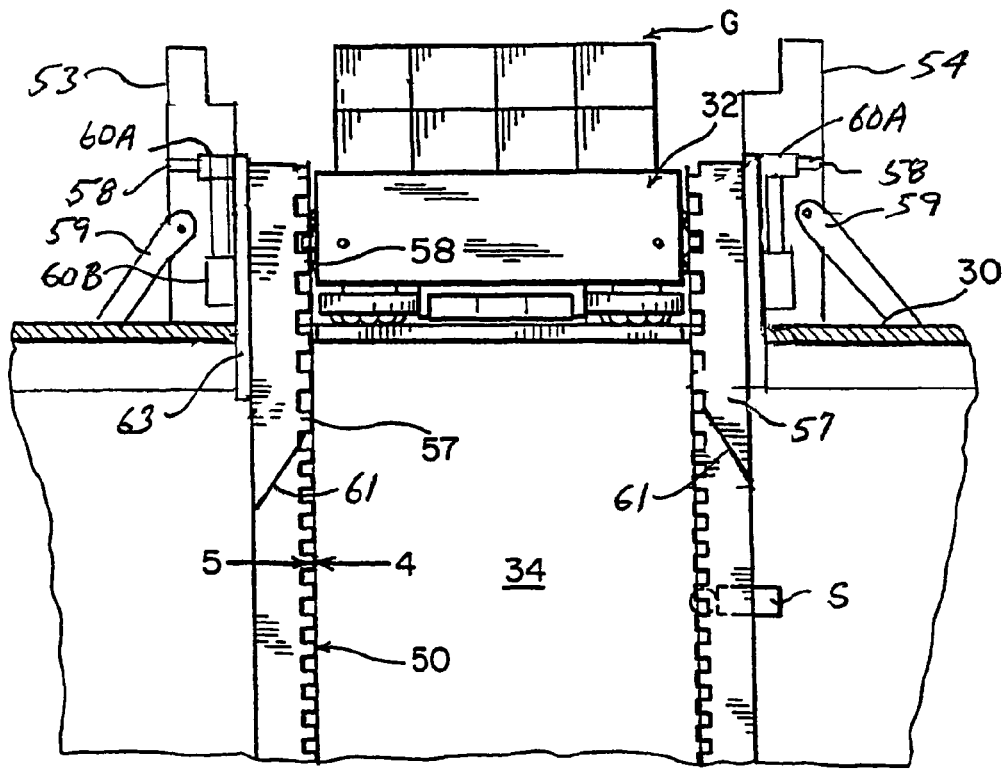
FIG. 9A is a view of the secondary rack system of the doors used in alignment with the racks of one of the open trunks of the present invention and showing the doors supporting the load transfer vehicle.
Figure 9B:
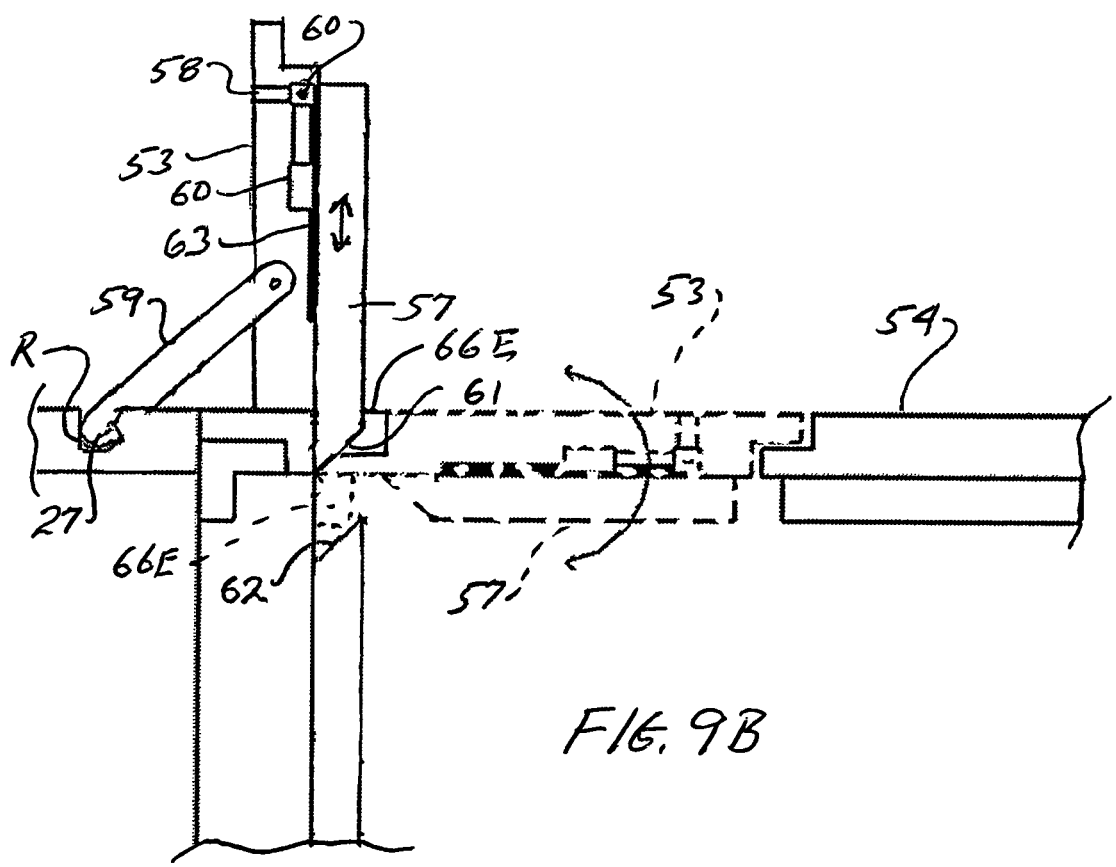
FIG. 9B is a schematic of the secondary rack system of the doors used in alignment with the racks of one of the open trunks of the present invention and showing the bracing system for the doors supporting the load transfer vehicle.

As one of the transfer vehicles 32 is being elevated relative to the closed doors 53 and 54, as shown in FIG. 7, the doors are designed to pivot to an open position as shown in FIGS. 9A and 9B to permit the vehicle to be elevated to the surface of the upper deck or level 30 so that the vehicle can be maneuvered outwardly of the trunk. As shown in the drawing figure, the doors are designed to be pivoted to an open position either automatically by control of a sensor operating device "s" or directly by impact of goods carried by the transfer vehicle 32 or by contact of the vehicle with the under surface of each of the doors.

Figure 4:
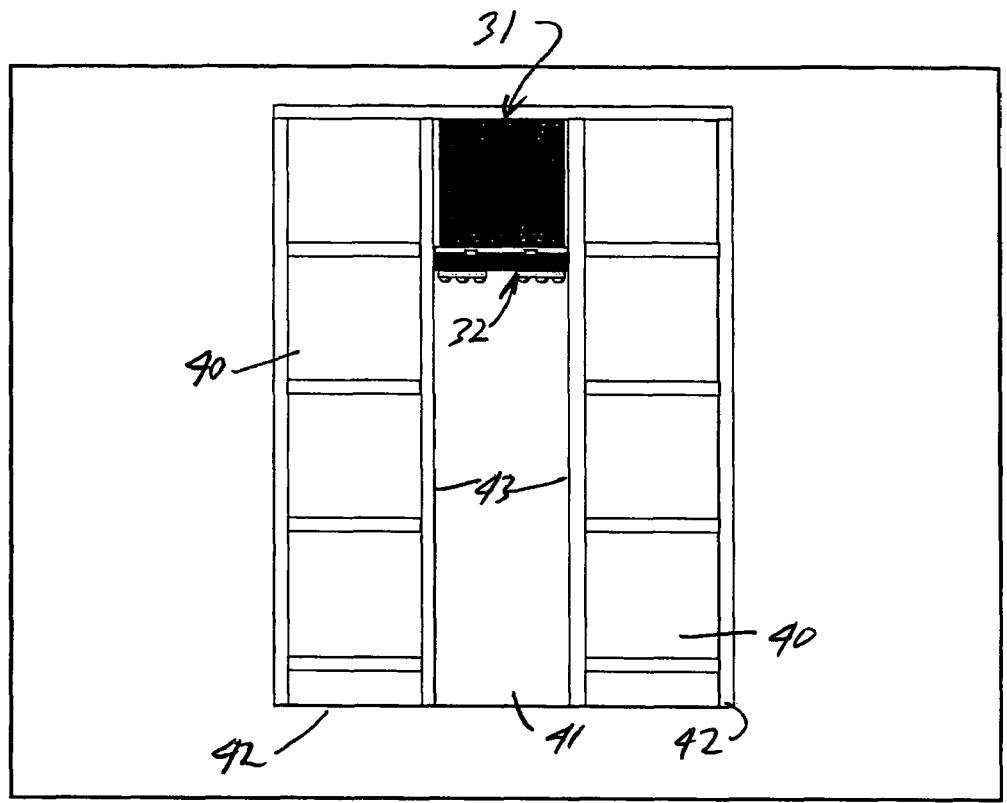
FIG. 4 is an illustration similar to FIG. 3 showing the vehicle ascended to a top bin.

As a transfer vehicle ascends vertically, the doors are forced to a vertically upright position as shown in FIGS. 9A and 9B wherein outer hooked ends 27 of pairs of hatch support struts 59 of each door seat within recessed stops "R" located within the upper level or deck. The recessed stops may be in a clover leaf configuration of the type used on naval ships for purposes of receiving cooperatively configured engaging elements secured to ends of tie down straps. In these instances, the ends 27 of the hatch support struts 59 may be cooperatively configured to be securely seated within such clover leaf recessed stops. Each of the doors 53 and 54 is also provided with a pair of secondary racks 57 along the lower surface thereof which are aligned with the racks 50 extending vertically along the opposing side walls, or corners, of each of the trunks, as is shown in FIG. 4.

The secondary or supplemental racks 57 are vertically movable as shown in FIG. 9B by activation of a drive shaft 58 that is connected to a drive motor (not shown) and which drive shaft is connected to pairs of worm gears 60 that drive rack supports 63 mounted to the back side of the secondary racks 57. The lower ends 61 of the secondary racks 57 are tapered or cooperatively configured so as to cooperatively engage and become locked with tapered upper ends 62 of the racks 50. In this manner, the racks 57 form a continuation of the rack system within each of the trunks which extends the rack system above the surface of the upper level of deck 30. The weight of each transfer vehicle which forces the doors 53 and 54 away from one another is offset by the engagement of the hatch support struts 59 of each door with the recessed stops "R".

As opposed to allowing the doors 53 and 54 to be pivoted by contact, a separate sensor "S", see FIG. 9A, may be mounted along one of the racks 50 to sense the approach of the transfer vehicle. The sensor may be electrically connected to appropriate drive motors for powering the doors 53 and 54 from the closed position shown in FIG. 10 to the fully open positioned shown in FIG. 9A prior to the transfer vehicle engaging either of the doors 53 or 54.

Figure 11:
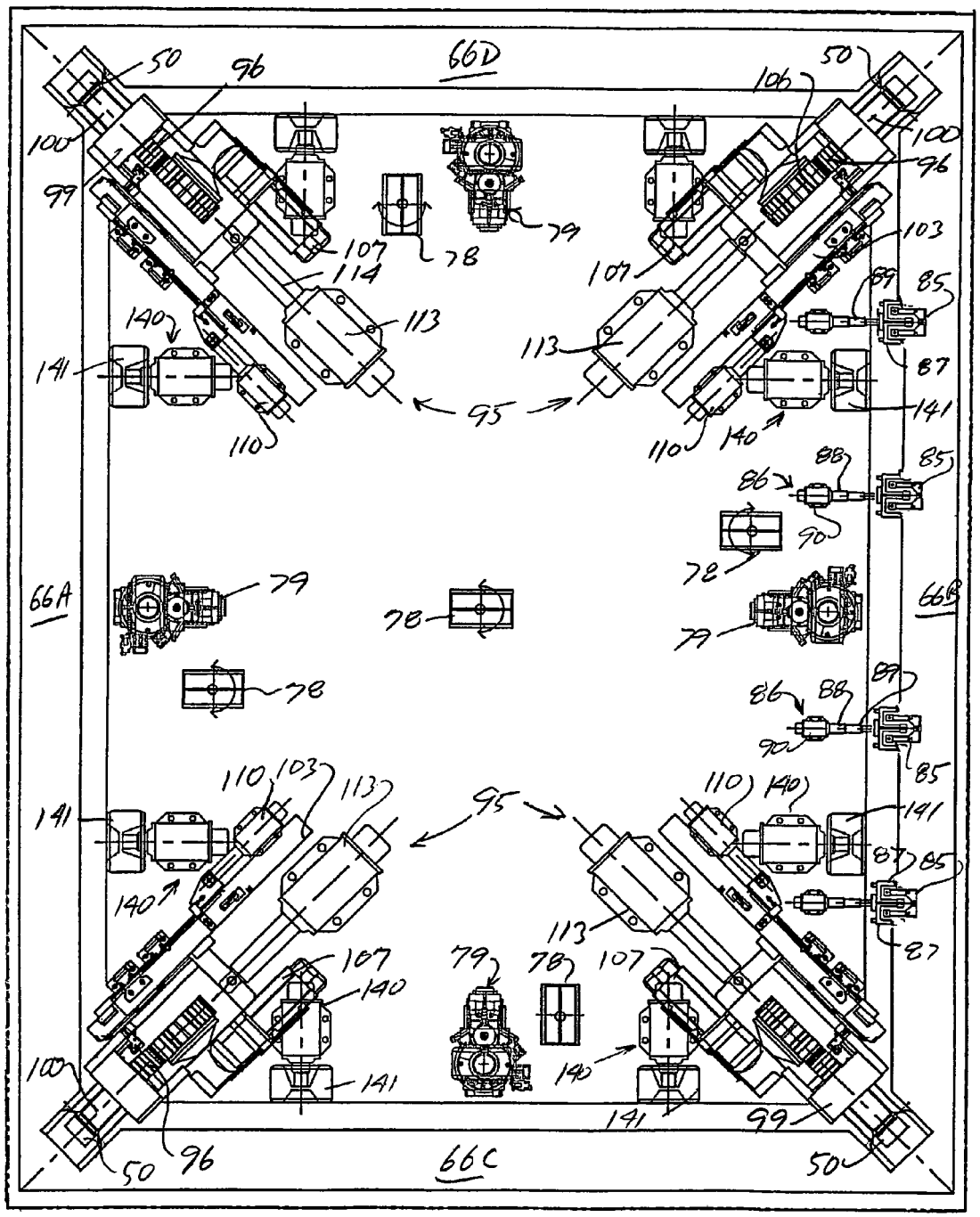
FIG. 11 top overlay view of a second embodiment of transfer vehicle used in accordance with the invention and showing the operative components relative to one of the trunks wherein second drive pinions are showed deployed to engage the racks at corners of the trunk and also showing power connections for the vehicle and an inductive energy supply system.
Figure 12:
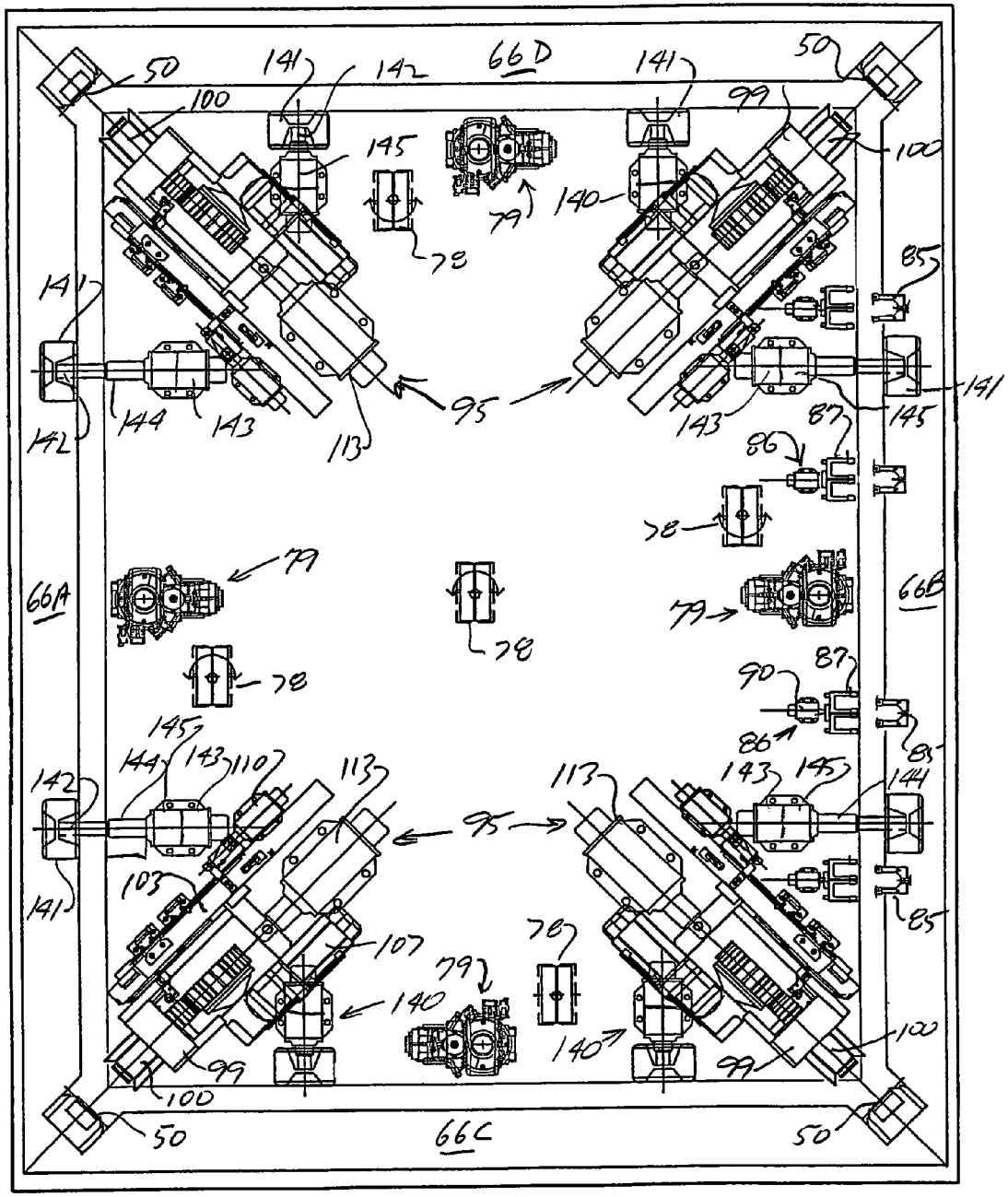
FIG. 12 is a view similar to FIG. 11 showing the second drive pinions withdrawn into the vehicle and showing third drive members extended to move the vehicle from the trunk.
Figure 13:
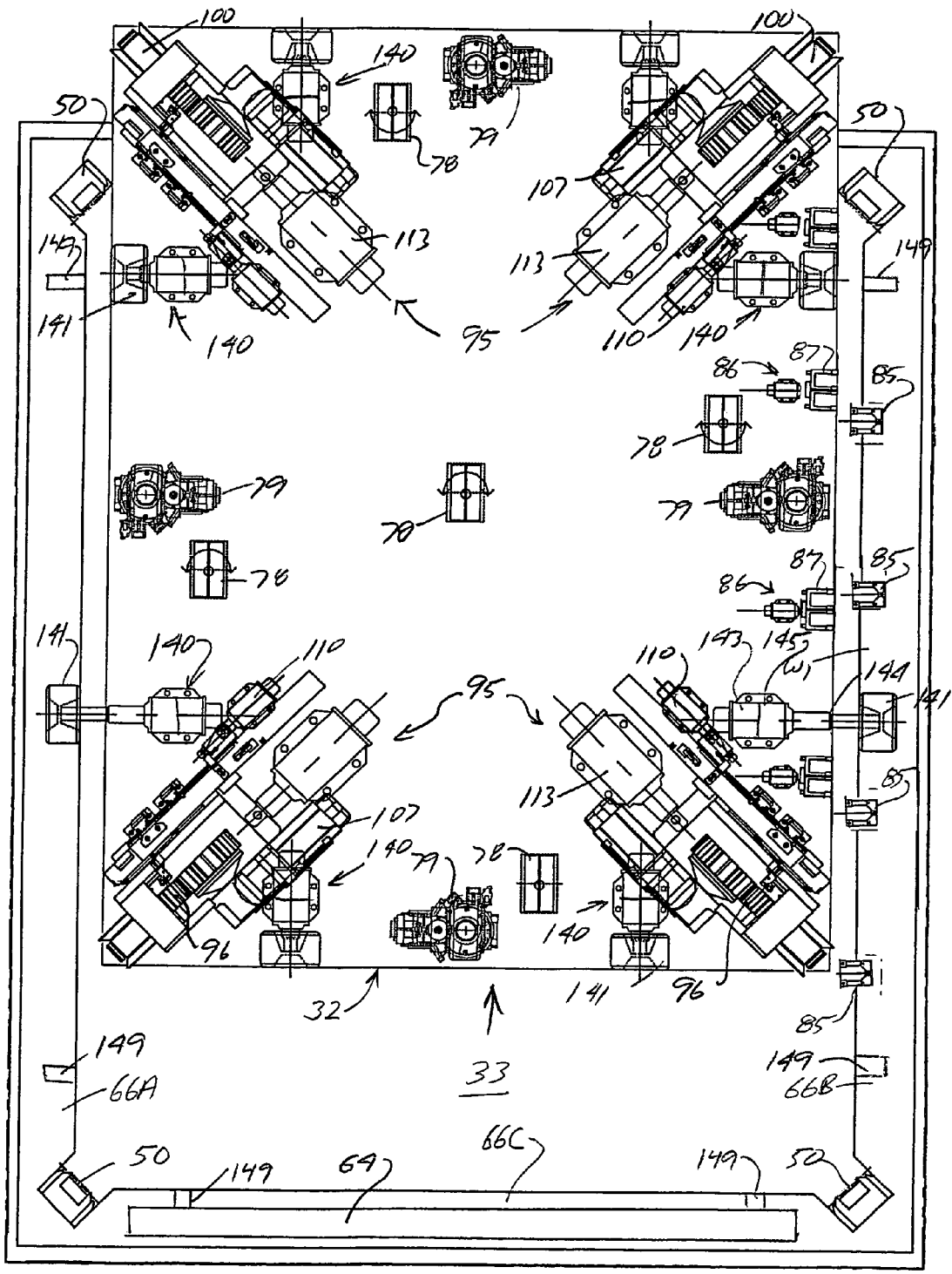
FIG. 13 is a view similar to FIG. 12 showing the vehicle beginning to exit the trunk.

With particular reference to FIGS. 11-13, in some embodiments of the invention, at each of the lower access openings 36 associated with each of the trunks 33 and 34, ingress and egress platform segments 66A-D are provided that extend inwardly toward the center of the trunks from the four sides thereof in such a manner that only an inch or less is left between the platform segments and the outer side surfaces of the vehicles. The platform segments are provided for purposes of allowing each of the transfer vehicles to propel itself both into, and out of, the trunks. Guide channels 64 may be provided along a portion of each of the opposing front and rear platform segments 66A and 66B and opposite side platform segments 66C and 66D, however, only one is shown in FIG. 13. The guide channels are provided to receive and provide positive guidance to sets of wheels, rollers or gears associated with selectively deployed third drive mechanisms or members that are used to facilitate the entrance and exit of the vehicles relative to the trunks. Similar platform segments 66E are provided between each pair of secondary racks 57 of the doors 53 and 54. These platform segments pivot to a horizontal position as the door are opened, see FIG. 9B.

As opposed to the plurality of platform segments of the previously described embodiment, a single large vehicle support platform 65 may be used to support the transfer vehicles at each of the access openings in the trunks. With specific reference to FIGS. 14-17, each platform 65 is pivotally mounted at 67 so as to be coextensive and level with the adjacent deck or floor surface when in a lower a deployed position thereof. When not in use, the platform is stored upright so as to be generally flush with or slightly recessed within the wall in which the access opening is provided. In this manner, the platform 65 functions as a safety to prevent accidental access to an open trunk as the platform closes the access opening until it is lowered to provide support for one of the transfer vehicles. It is preferred that platform 65 be used in association with the previously described doors 29 associated with each access opening, however, in some embodiments the platforms could be used or function as the doors for the access openings.

Figure 18:
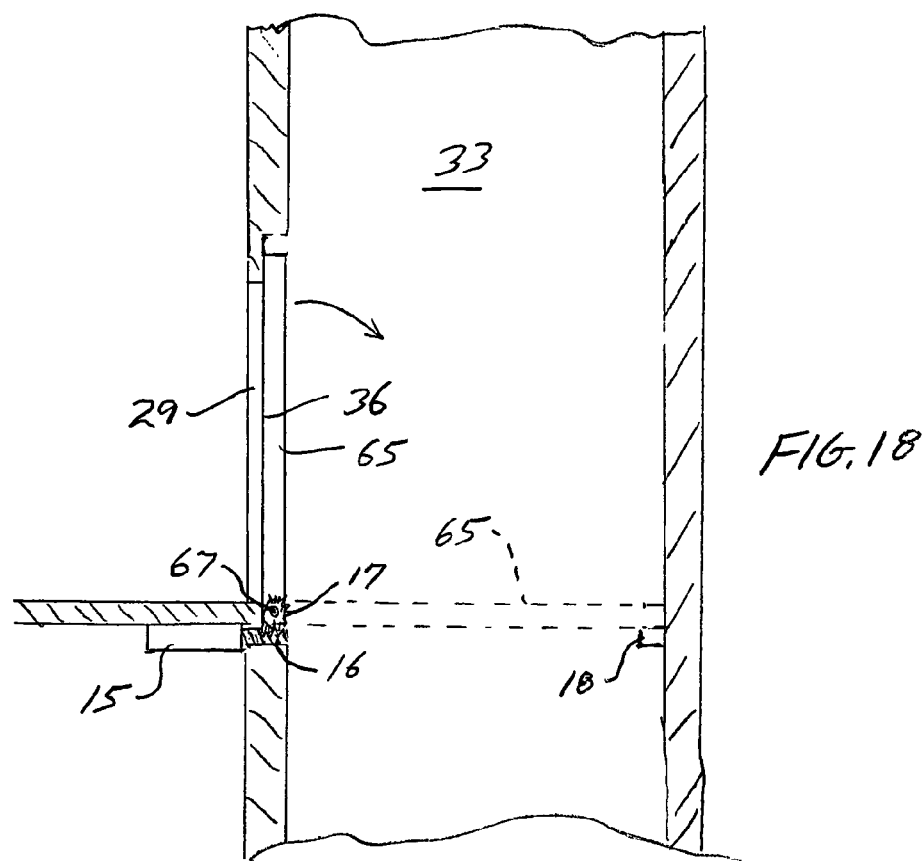

In this embodiment of the invention, the transfer vehicles do not require any third drive assemblies to ingress or egress the trunks. Rather, the first drive assembly that is used to propel the vehicles across the decks or floors is used to propel the vehicles when supported on the support platform 65. When it is desired to lower a support platform 65 so that a vehicle may enter or exit a particular access opening, a control, not shown, activates a reversible drive electric motor 15 that drives a drive gear 16 that engages a driven gear 17 that is fixed to the platform pivot 67 so that the platform is rotated from the elevated storage position of FIG. 18 to the deployed position shown in dotted line in FIG. 18 and FIG. 15. To support the platform 65 in the deployed position, a reinforced support ledge 18 is provided within the trunks and between the racks 50 on which the upper or side edges, or both, of the platform are seated as the platform is lowered.

The trunks which extend through the various levels, when used on a ship, will normally only be anchored generally at each of the deck levels so as to be somewhat yieldable with the deck components of the ship. Thus, the racks are somewhat flexible to account for forces imparted on the structural elements of the ship during high seas when a great deal of force is placed on such structural elements requiring that they flex.

With specific reference to FIG. 6, a first embodiment of load transfer vehicle 32 is disclosed in greater detail. In this embodiment, the vehicle includes a body or frame having an upper surface 70, lower surface 71, front end 72 and rear ends, and opposite sides 74 and 75. A pair of spaced and opposing generally parallel L-shaped tracks 76 are secured to the upper surface on which various storage containers or pallets 31, as previously described, are selectively supported when being transported. As opposed to separate spaced tracks 76, a substantially continuous support surface may be provided along the upper surface of the vehicle. In some embodiments, upwardly extending supports 77 are mounted, such as by welding, to the upper surface of the frame and adjacent the sides thereof. An electronic programmable controller 83 for the vehicle is mounted to one of the supports 77 and may include a number of communication and computer elements for automatically controlling the movement of the vehicle as described herein.

The body is supported by a plurality of heavy duty rollers, bearings or castors 78 that are mounted to the frame. The rollers or castors are pivotally mounted to permit omni-directional movement of the vehicle. The number of rollers will vary and will depend on the anticipated weight to be carried by the vehicle.

Figure 19:
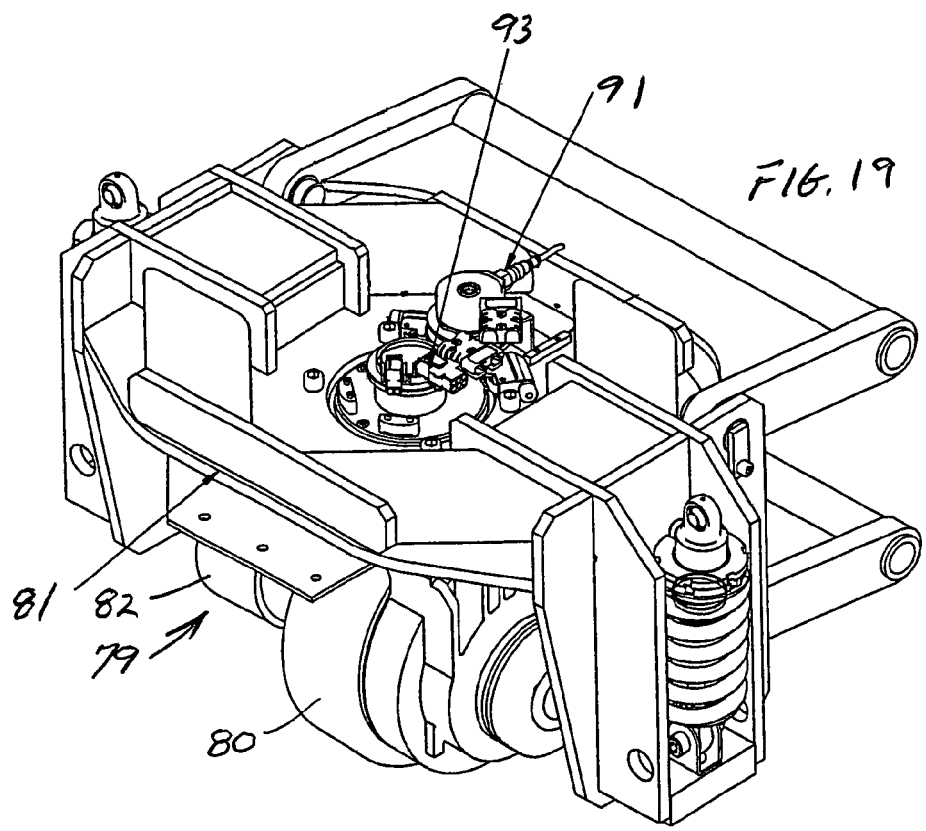
FIG. 19 is a perspective view of the first drive assembly of the vehicles of the invention.

The transfer vehicle 32 is maneuvered horizontally across the various level or deck surfaces by first drive assemblies 79, see FIG. 19, that include omni-directional propelling or drive wheels 80 which are pivotally mounted generally centered adjacent each of the sides and ends of the vehicle by pivotal mounting yokes 81. The mounting yokes preferably permit the wheels to be steered through approximately 180°0. Each of the wheels 80 is driven by an electric motor or other drive device 82. The motors are design to provide motive power both in forward and reverse directions, as is necessary. Control of the steering direction of the drive wheels 80 is accomplished by steering motors 91 mounted within the vehicle and which drive steering gears 93 connected to the yokes 81 to which the wheels are mounted. The steering motors 91 may be driven in either direction depending upon input from the controller 83. The surface of the wheels 80 may be textured in order to provide greater frictional contact between the wheels and the surface over which the vehicle passes.

Figure 14:
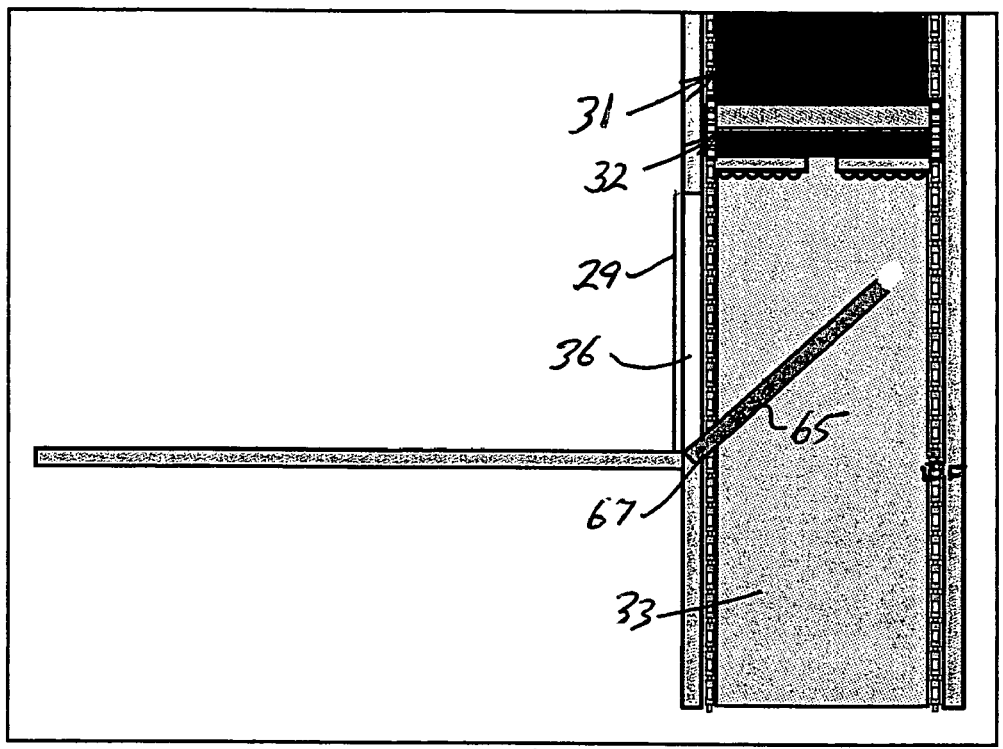
FIG. 14-18 are illustrations of a platform for use in load and off-loading vehicles of the present invention.
Figure 15:
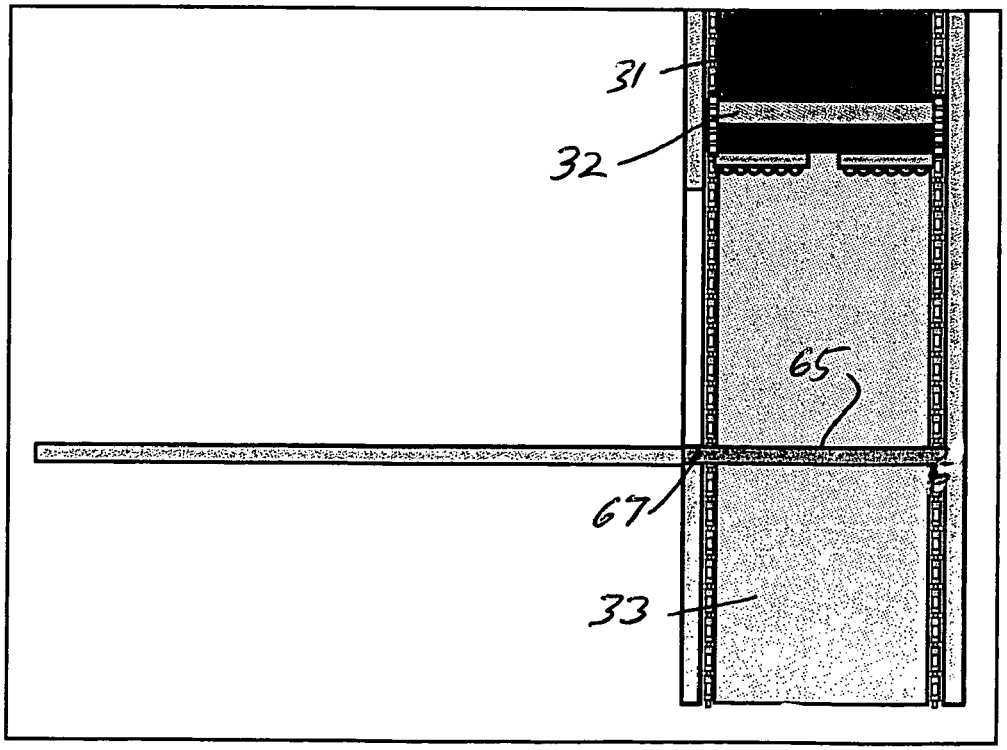
Figure 16:
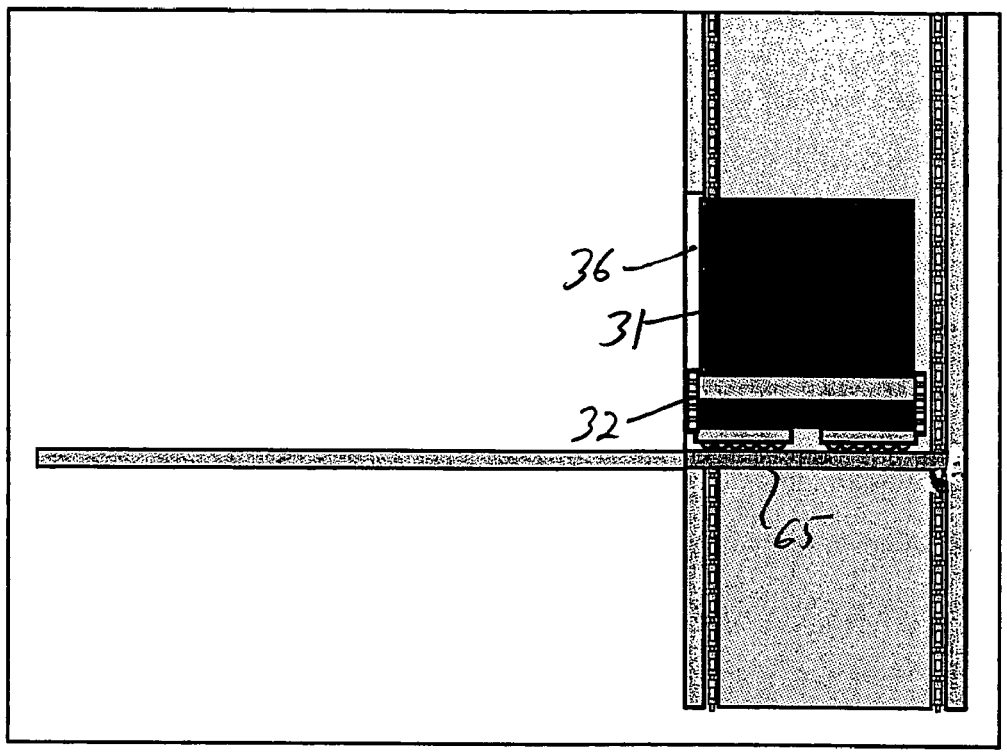
Figure 17:
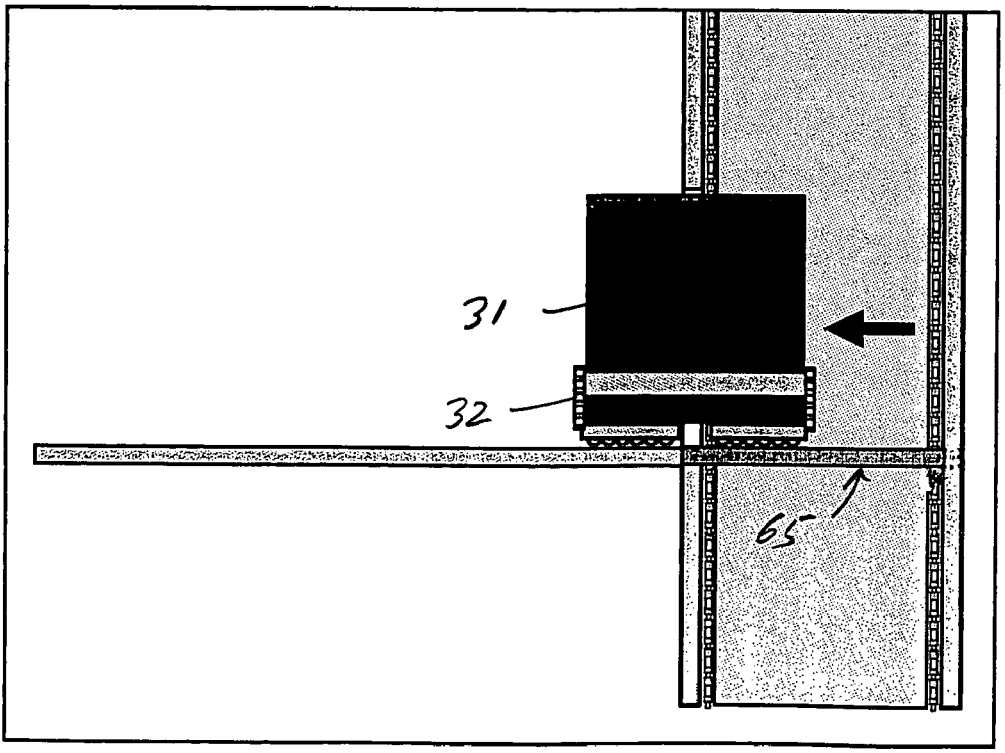

The motors 82 and 91 are electrically connected through the on-board programmable controller 83 to a source of electrical power, such as on-board rechargeable batteries 84 mounted interiorly of the body or frame. The vehicle may also be powered by other sources of electrical supply such as an electrical raceway or, more preferably, by way of a contactless inductive power transfer system. With reference to FIGS. 13-15, one such contactless inductive power transfer system includes IPT® rail conductors 85 that extend vertically along a common connector wall W1 that extends between the two trunks. IPT® is a registered trademark of Wampfler Inc. of Florence, Ky., USA. The Power to the IPT® rail conductors is from electrical power systems on board a ship or mains power supplied to a storage or warehouse facility. Power from the IPT® conductors is transferred to the motors 82 and 91, as well as other motors and electrical equipment of the vehicle, by power collector assemblies 86 that include arm portions that are selective deployed from stowed positions within the vehicle. As shown, each of the collector arm portions supports an electrical pickup 87 at the outer end thereof, which is preferably of an E-shaped configuration and which is also part of the Wampfler, Inc. IPT® system. The E-shaped configuration allows the pickups to be properly positioned relative the two electrical conductors of each IPT® rail. Power received by the pickups 87 when the arm portions are deployed will also be available to continuously charge the batteries.

Each of the arm portions of the power collector assemblies is also constructed to permit selective extension and deployment of the electrical pickups 87 and in this respect, include two or more telescopic arm segments, such as shown at 88 and 89 in FIG. 11. Small motors 90 mounted at the base of each collector arm are selectively powered to extend or retract the telescopic arm segments to either deploy or withdraw the pickups relative to the IPT® rail conductors through the use of a rack and pinion drive arrangements. In the drawings, four separate collector arms 86 are provided in the vehicle that cooperate with four sets IPT® rail conductors.

The controller 83 is connected to the transponder 37 and allows the vehicle 23 to be operated such as an automated guided vehicle (AGV), that can track and record X, Y and Z coordinates of its movement at all times. Further, in some embodiments, the controller 83 of each of the vehicles may be in communication with other vehicles operating within a system to ensure that the vehicles do not interfere with one another during movement across the various levels or decks and through the various trunks. GPS systems may be incorporated within the controller 83 in order to provide exact location coordinates for the vehicles at all times which coordinates are monitored during use of each vehicle. Control can be provided by the control computer "C" located within the system.

As previously described, when a vehicle receives goods to be stored, such as illustrated in FIG. 1 along the upper level 30, the transponder 37 may include an RF transponder for reading RF tags associated with the goods. In this manner, the controller can communicate with the central computer and the computer can advise the controller of the exact location or storage bin in which the goods are to be stored. As opposed to using RF tags, other types of electronic identification systems may be used such as bar code labels and the like.

With respect to the first horizontal drive system 79 incorporating the drive wheel 80, various types of braking mechanisms may be used to prevent motion of the vehicle, especially if the system is being used within an ocean going vessel. One type of braking system is an anti-backdrive gear for use with each of the gears connected between the wheel 80 and the drive motor 82. An anti-backdrive gear prevents any force from rotating the motor drive shaft other than the motor itself, thus functioning as an effective braking mechanism.

As previously noted, the load transfer vehicles of the present invention are designed not only for movement across floor or deck surfaces but also include secondary vertical drive assemblies or systems 95 for allowing the vehicles to move themselves vertically through the hollow trunks. As previously described, in some systems, two sets or pairs of racks 50 may be secured in generally opposing relationship with one another to the side walls of the trunks whereas in other systems the racks 50 will be positioned diagonally at the corners of the trunks. In this respect, and as is illustrated in the layouts of FIGS. 11-13, in one embodiment of the invention, each vehicle 32 includes four second drive assemblies 95 positioned adjacent each of the four corners thereof. With reference to FIGS. 11-13 and 20, each of second drive assemblies includes selectively deployable drive gears or pinions 96 that cooperatively mesh with the teeth of the racks 50. Such pinions, in other embodiments, will be deployable outwardly from the opposite ends of the vehicle spaced inwardly of the corners of the vehicle, as will be described hereinafter with respect to FIGS. 6 and 21-23.

Each drive pinion 96 is rotatably and slightly floatably mounted between inner and outer support plates 97 and 98 of a bracket assembly 99 so as to be intermediate upper and lower guide rollers 100 and 101, respectively, that are also rotatably carried by the bracket assembly so as to be slightly vertically adjustable. The guide rollers have spaced outer and inwardly tapered guide flanges 102 that are designed to engage the outer flanges 51B of an opposing of the vertical racks 50 in such a manner as to properly align the pinion into meshed engagement with the teeth 51A of the rack as the pinion is deployed outwardly toward the rack from within the transfer vehicle.

Figure 20:
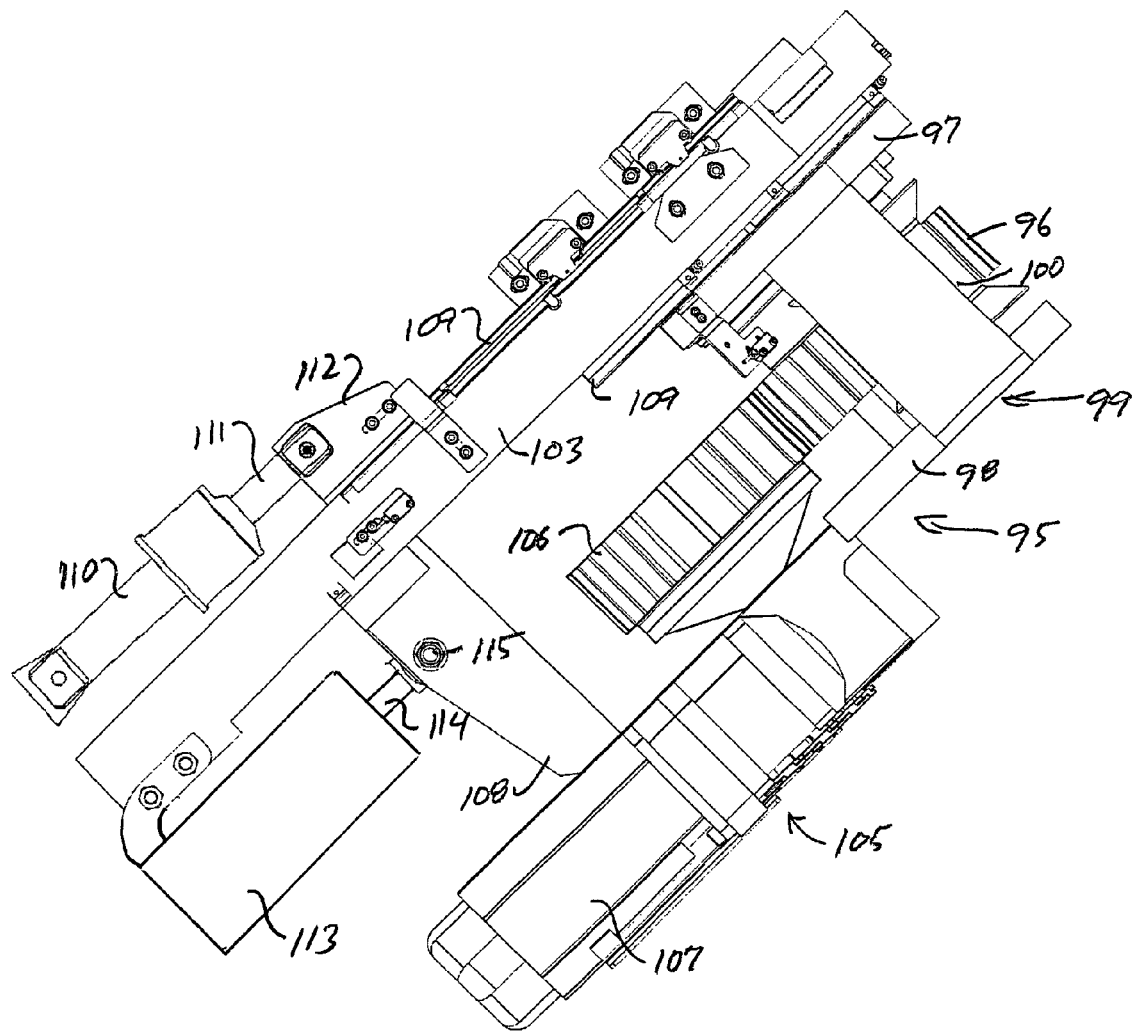
FIG. 20 is a top plan view of a first embodiment of second vertical drive assembly in accordance with the invention.
Figure 21:
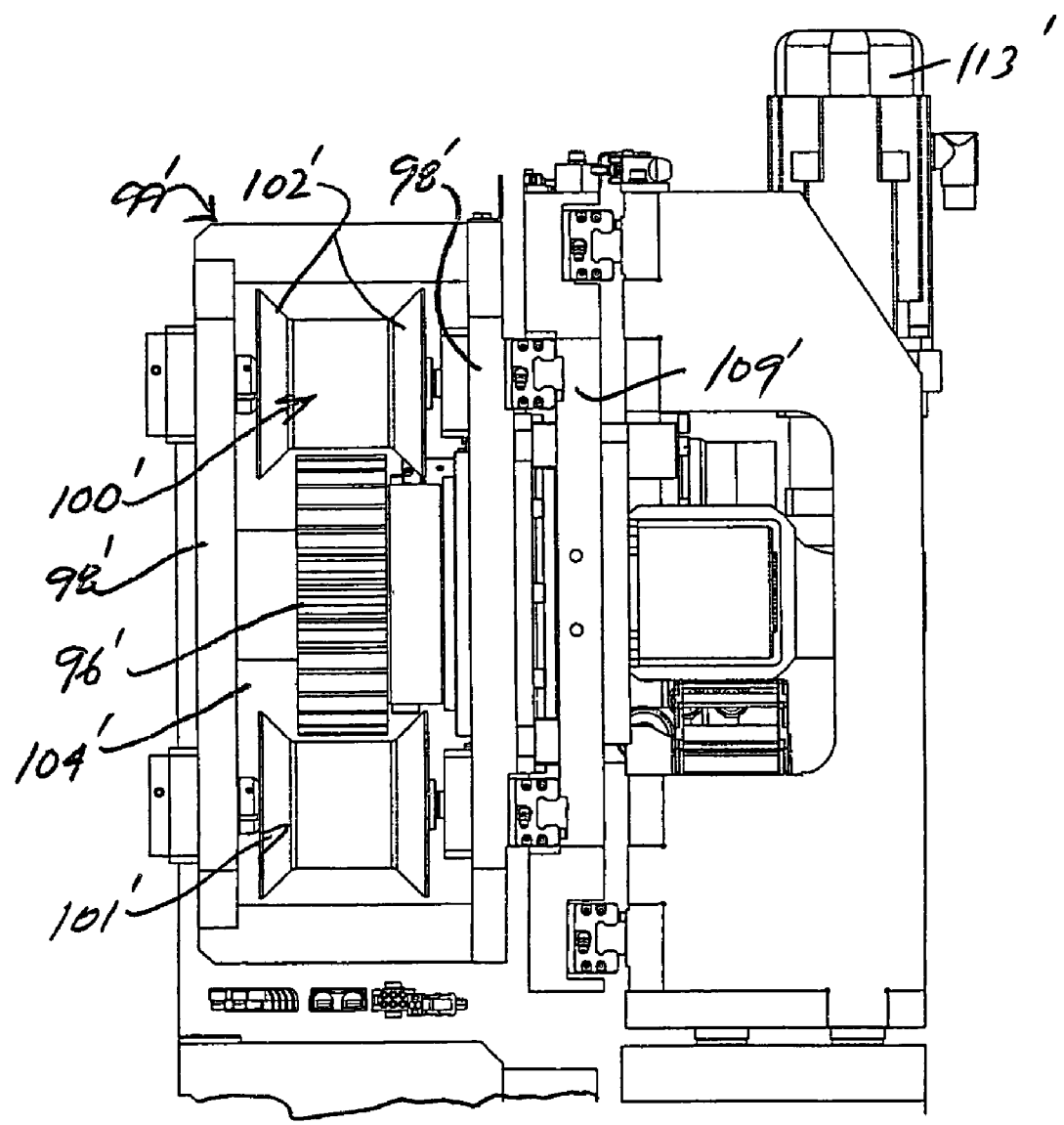
FIG. 21 is a front elevation of an alternate embodiment of second vertical drive assembly in accordance with the invention.

As shown in FIG. 20, a pinion drive assembly 105 is mounted to the outer support plate 98 of the bracket assembly 99 and includes a pinion drive gear 106 that is driven by an electric motor 107 by way of intermeshing gears, not shown. The motor 107 is mounted to an outer end of a base plate 108 that has an inner end that is mounted to an adjustable or movable carriage plate 109 to which the inner support bracket plate 97 is mounted. The carriage plate is reciprocally mounted to a guide housing 103 that is secured to the frame of the vehicle 32. A position of the movable carriage plate 109 may be selectively adjusted using a further electric motor 110 that engages a reciprocating adjustment rod 111 connected by bracket 112 to the carriage. To deploy and retract the bracket assembly 99 with the guide rollers 100 and 101 and the pinion gear 96 together with pinion drive assembly 105, an electric motor 113 is drivingly engaged with a reciprocally movable extension rod 114 that is connected at its outer end 115 to the base plate 108.

With reference to FIG. 11, the bracket assemblies 99 are shown as being fully extended such that the drive pinions 96 are in engagement with the teeth of the opposing racks 50. When in the deployed position, activation of the motors 107 to rotate in cooperation with one another will cause the transfer vehicle to move along the vertical racks 50. To ensure that the output from the motors 107 is fully synchronized, one motor of the four will be the master motor while the others will be electronically connected thereto to function as slave motors. Separate braking mechanisms may also be associated with each of the motors 107 to ensure that the transfer vehicle will only move vertically within a trunk when driven by the four motors 107. The braking mechanism may take the form of anti-backdrive gears that may be mounted between the output drives of the motors 107 and the pinion drive gears 106. As opposed to using anti-backdrive gears, electro-mechanical brakes may be used to control braking as a vehicle ascends and descends within one of the trunks. In FIGS. 12 and 13, the bracket assemblies are shown as being retracted within the body of the transfer vehicle by retraction of the rods 114 by the motors 113.

Figure 22:
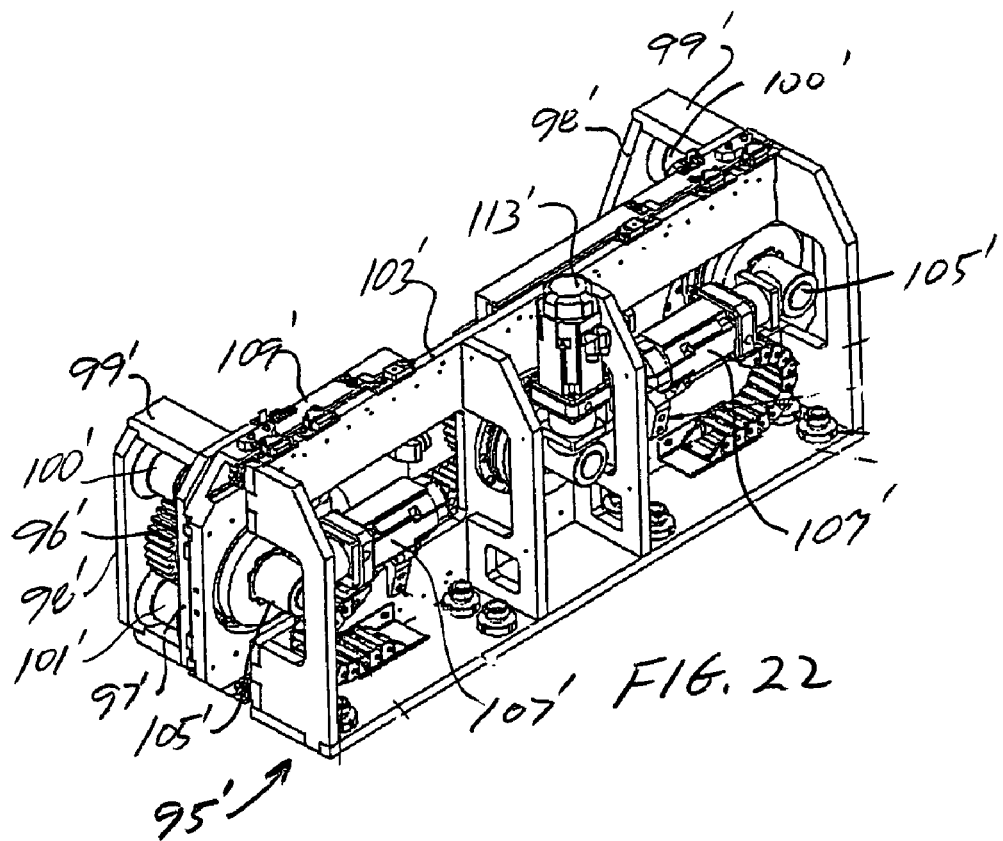
FIG. 22 is a front perspective view of the embodiment of FIG. 21.
Figure 23:
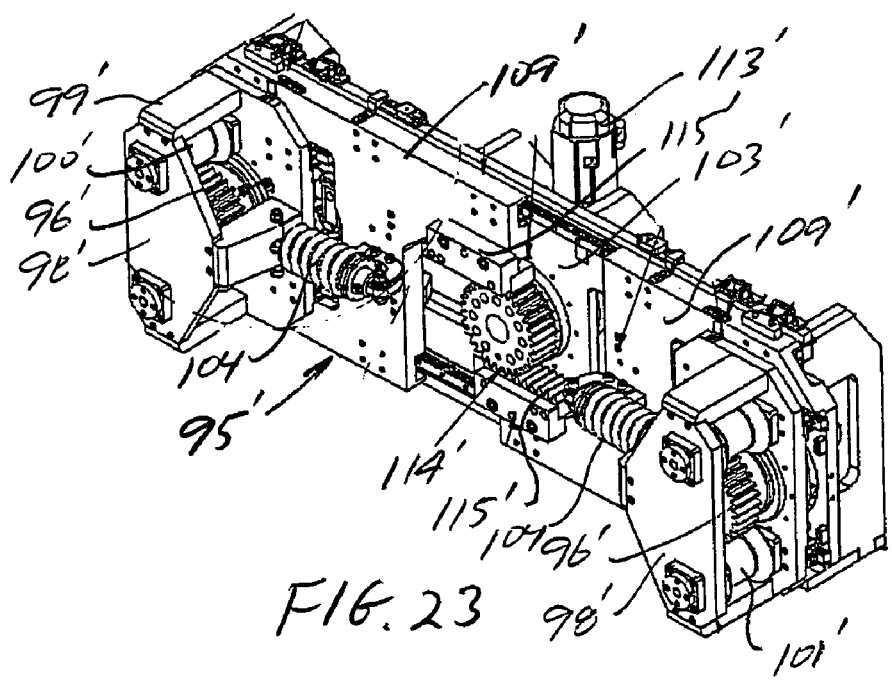
FIG. 23 is a rear perspective view of the embodiment of FIG. 21.

The second embodiment of vertical drive assemblies 95' are slightly modified and the gear racks 50 are mounted to opposing side walls of a trunk spaced inwardly from the corners as opposed to the corner mounting described above. With specific reference to FIGS. 6 and 21-23, the modified vertical drive assemblies also include a drive pinion 96' that is rotatably and slightly floatably mounted between inner and outer support plates 97' and 98' of a bracket assembly 99' so as to be intermediate upper and lower guide rollers 100' and 101', respectively, that are also rotatably carried by the bracket assembly. The inner support plate 97' is also mounted on a movable carriage plate 109' that is reciprocally mounted within a guide housing 103' that is fixed to the frame of the transfer vehicle. In this embodiment, a pinion drive assembly 105' is mounted to the carriage plate 109' and includes a drive shaft, to which the pinion gear 96' is secured and that is driven by an output of an electric motor 107' by way of intermeshing gears, not shown. The motor 107' is mounted to the carriage plate. As shown in FIGS. 22 and 23, each housing 103' supports two of the support brackets 99' and the related drive pinions 96' and guide rollers 100' and 101' as well as their related carriage plates 109' and pinion drive motors 107'. However, in this embodiment, only a single deployment motor is necessary to deploy and retract the bracket assemblies 99' with the guide rollers 100' and 101' and the pinion drive assemblies 105'. In this respect, a single deployment electric motor 113' is mounted to the housing 103' and drives a rotary drive gear 114' that is drivingly engaged with gear racks 115' that are secured to the movable carriage plates 109'. As the rotary drive gear rotates, the carriage plates of the back-to-back carriage plates are simultaneously moved in opposite directions. As the carriage plates are oriented in opposing relationship, as the drive gear 113' is rotated in a first direction, both of the carriage plates 109', and thus the vertical drive pinions gears carried thereby, will be deployed outwardly relative to the transfer unit or vehicle and on opposite sides thereof, and when the drive gear 113' is rotated in a reverse direction, the carriage plates, and thus the pinions 96' will be withdrawn or retracted within the vehicle or transfer unit. As shown in FIG. 23, shock absorbers 104 may be secured between the carriage plates 109' and the support brackets 99'.

The deployment of the vertical drive pinions is controlled 83 by electronic communication with the controller of the transfer vehicle. Hydraulic or pneumatic cylinders may also be used to manipulate the deployment or withdrawing of the vertical drive pinions relative to the body of the transfer unit. Each of the pinions extends outwardly through openings (not shown) that will be provided through an appropriate covering for the frame of the transfer vehicles.

The vertical drive assemblies 95/95' are retracted within the vehicle as the vehicle enters or exits one of the trunks. After a vehicle enters a trunk, the vertical drive pinions are extended to engage the racks 50 at each of the corners or side walls of the trunks to thereby provide drive and support for the vehicle within the trunk. The upper and lower flanged guide rollers 100/100' and 101/101' will assure proper alignment of the vertical drive pinions with the racks 50.

With the present embodiment, the vertical drive pinions 96/96' are driven uniformly at the same rate of rotation by controlling the drive motors as described and which are electrically powered by the battery 84, or other source, such as from the IPT conductors, and which power is controlled through the controller 83.

In the embodiment of the invention as shown in FIG. 6, wherein the two spaced vertical racks 50 are provided spaced inwardly relative to the corners of the vertical trunks on two opposing side walls of the trunk, ingress and egress of the article transfer units is only possible through the opposing sidewalls of the trunks on which no racks are provided. In the embodiments where the racks are corner mounted, it is possible to provide ingress and egress to the trunks in three directions, and if a single trunk is used, four direction of ingress and egress are possible.

The rechargeable batteries 84 are designed to be charged by the power from the inductive circuit previously described, however, they may also be charged through charging sockets provided on the vehicle when the vehicle is not in use. It is another feature of the present invention that the batteries may also be charged by one or more on-board generators which could be connected to be driven as the pinion gears 96/96' are driven. In this manner, part of the energy created during the downward movement of the vehicle within the trunk can be used to generate power to partially recharge the battery, or batteries, for use during horizontal or upward travel. The generator is electrically connected so as to provide electrical power to the batteries whenever the vehicle is moving in a descending manner within each of the trunks. Thus, the weight of the vehicle can be used to create a source of energy supply such that gravity pulling the vehicle downwardly relative to the racks will cause rotation of the drive pinions that can be used to power the generator.

When anti-backdrive gears are utilized, some power must be provided for driving the motors in a reverse direction and thus the anti-backdrive gear arrangement is not preferred if charging of the batteries is desired during descending movement of the vehicles within the trunks.

In those embodiments of the invention in which the plurality of platform segments are provided within the trunks, the load transfer or transport vehicles 32 will include a plurality of third drive assemblies 140 for moving the vehicles into and out of the trunks by cooperative engagement with the platform segments previously described. The placement of the third drive assemblies is shown in FIGS. 11-13 for use on vehicles having corner mounted second vertical drive assemblies 95 that permit a vehicle to enter or leave one of the trunks in three directions. With these vehicles, two of the third drive assemblies are provided in spaced relationship with one another on each side and each end of the vehicles. When vehicles are to be used having the side mounted second vertical drive assemblies 96', two spaced third drive assemblies are provided along the same sides of the vehicle as the second vertical drive assemblies.

Each third drive assembly 140 includes a drive wheel, roller or gear 141 that is driven by a drive shaft 142 that is selectively extendable relative to a reversible electric rotary drive motor 143 by way of one or more reciprocating support arms 144. The one or more selectively extendable support arms are extended and retracted from within the body of the transfer vehicles 32 using small electric deployment motors 145 having output drive gears, not shown, that mesh with rack elements or gears, not shown, associated with the extendable support arms 144. Only when the support arms are fully extended so that the wheels 141 are in engagement with the platform segments 66A-E can the wheels be effectively rotated by the rotary drive motors 143. Upon activation of the motors 143 the wheel 141 are used to move a vehicle relative inwardly or outwardly of one of the trunks. In FIG. 12, the drive wheels 141 of the third drive assemblies are shown as be fully deployed such that the wheels engage the platform segments. As the vehicle is being propelled from the trunk as shown by the arrow in FIG. 13, one set of the wheels is automatically withdrawn into the vehicle by operation of its associated deployment motor 145 so as not to interfere with the racks 50. Once the vehicle has moved a sufficient distance from the trunk, motive power can be supplied by the fist drive assembly. To provide further guidance for the transfer vehicles as they enter and exit the trunks, the wheels or rollers 141 may engage within tracks or channels 64 formed in the platform segments, only one being shown for example in FIG. 13.

As previously noted, with the embodiment of the invention disclosed with respect to a ship board system wherein the vehicles may exit or enter the trunks from either side or the front of each trunk, only two opposite pairs of support arms 144 are deployed at a time depending on the direction of movement of the vehicle. It should also be noted that only after the support arms 144 are fully deployed so that a vehicle is supported on the platform segments can the vertical drive pinions be retracted or disengaged from the racks 50. As a safety, it is preferred that two sensors be associated with each third drive assembly. One sensor will be connected to provide the on-board controller 83 with information regarding the extent of the deployment of the support arms 144 and another senor associated with each wheel, will advise the controller 83 when the wheels are in engagement with the platform segments. Both sensors must communicate with the controller that the wheels are fully extended and that they are in engagement with the platform segments before the motors controlling the deployment of the pinion gears 96/96' can be activated to disengage the pinion gears from the racks 50 of the trunks.

As each of the third drive assemblies 140 operates in the same manner, only one will be described in detail. As shown in FIG. 12, the support arm 144 and the drive wheel 141 are extended outwardly by the controller 83 activating the deployment electric motor 143 to rotate in a first direction until the roller 141 is in engagement with the adjacent platform segment. When the sensors permit, the controller withdraws the vertical drive pinions 96/96' and power is thereafter applied to the rotary drive motor 144 to rotate the wheel to move the vehicle from within the trunk. Sensors 149, shown only in FIG. 13, detect the vehicle moving toward an adjacent vertical rack 50 and signals the controller 83 to initiate a reverse drive of the motor 143 thereby withdrawing the support arm 140 into the vehicle with power to the motor 144 being simultaneously terminated. The deployment of the support arm and wheel to facilitate a vehicle entering the trunk is simply a reverse process wherein, as the vehicle approaches the trunk, the horizontal drive wheels will move the vehicle partially into the trunk until opposite support arms are fully deployed so that the associated wheels engage the opposite platform segments, after which the third drive wheel 141 are powered to move the vehicle into the trunk.

In accordance with the alternate embodiment of the invention previously described wherein a continuous platform 65 is used as opposed to the platform segments, the third drive mechanism of the vehicles may not be necessary. In this alternate embodiment, the side oriented ingress and egress platform segments 66A-D are replaced by the vehicle support platforms 65 position at each floor of the system.

In the use of this embodiment of the invention, when one of the vehicles 32 is to be off-loaded at a predetermined level, deck or floor, the vehicle is moved to a position adjacent the next higher level. At this time, the controller 83 activates the motor 15, see FIG. 18, to cause the platform at the desired level to be lowered until the platform engages the supports 18. With the platform deployed, the vehicle is lowered using the second drive assembly 95/95' until the vehicle rests on the platform. At this time, the door to the ingress and egress opening is opened and the vehicle is thereafter free to power itself out of the trunk using the omni-directional drive wheels of the first drive assembly. For safety reasons, a sensor system is employed that senses when a platform at a particular level is in its lowered position. The sensor is connected to a locking device associated with the door that prevents the door 29 to the adjacent ingress and egress opening from being opened unless the platform is in its lowered position. In this manner, individuals are protected from falling into the trunk when a door is opened.

Because the electrical power collector arm segments 88 and 89 must be withdrawn to a non-deployed position with respect to a vehicle to permit movement into and out of a trunk and to permit movement along a horizontal surface, each vehicle will be powered by the on board batteries during such movements. The selective extension and retraction of the collector pickups 87 is controlled by the controller 83 such that whenever the wheels 141 of the third drive assemblies are deployed, the collector pickups will be automatically withdrawn within the vehicle by the motors 90.

Figure 3:
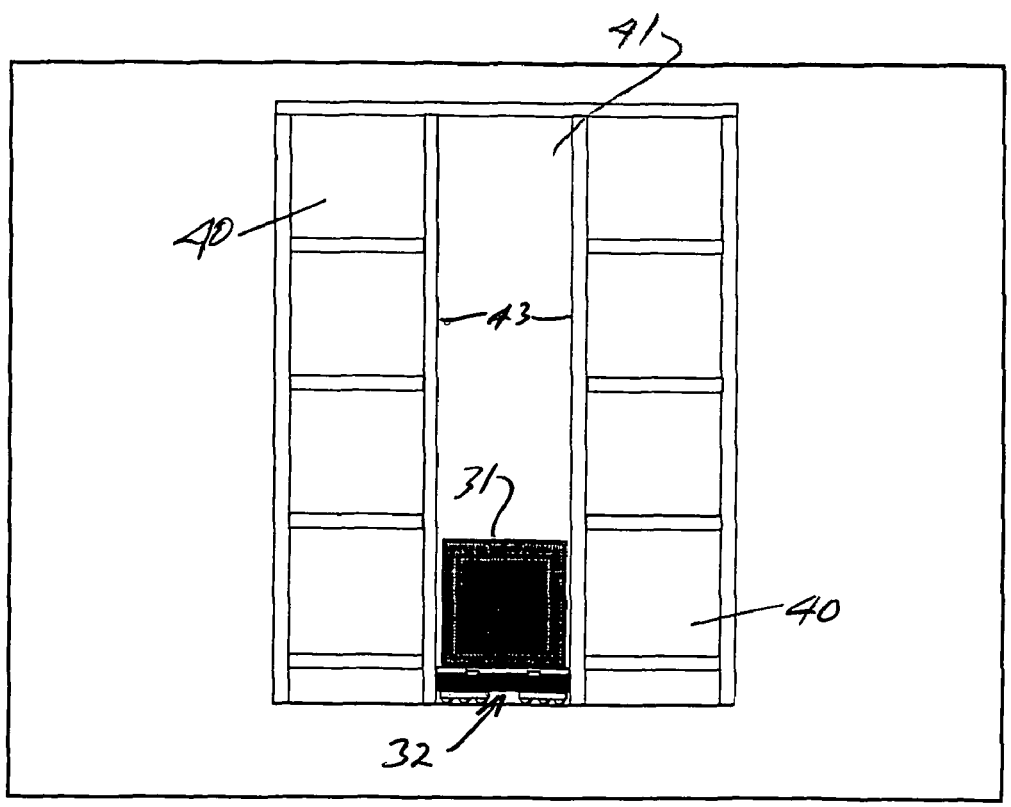
FIG. 3 is an illustration of two vertical stacks of storage bins that can be automatically loaded and unloading using the vehicles of the invention.
Figure 5:
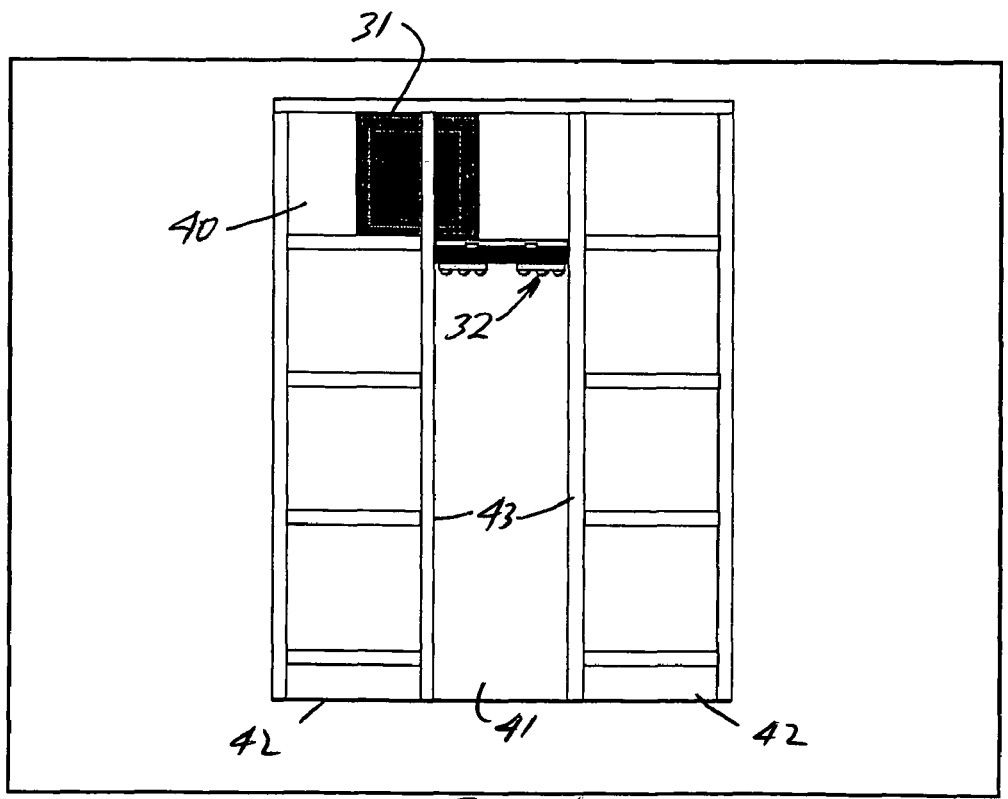
FIG. 5 is an illustration similar to FIG. 4 showing a pallet being off-loaded into a bin.

With specific reference to FIGS. 3-5, the present embodiment of load transfer vehicle 32 is shown being maneuvered between rows 42 of storage bins 40 as previously discussed. The vertical supports of opposing storage bins are provided with the vertically extending racks 43 similar to the vertically extending racks 50 described with respect to those in the open trunks. By providing the racks 43 in opposing relationship with one another within the storage bins, the load transfer vehicle 32 can be used to elevate goods within the storage bin area by operation of the vertical drive motors previously described thus causing the vertical drive pinions 96/96' to engage the racks 43 to either elevate or descend the vehicle relative to the storage racks. The movement of the vehicle relative to the storage bins to off-load a pallet is illustrated in FIGS. 3-5.

As opposed to using the pinions for creating vertical movement relative to the storage bins, in some embodiments, a scissors lift or other mechanism may be provided within the transfer unit for elevating an upper platform mounted to the vehicle.

Each of the transfer vehicles of the invention may include means for providing a self-loading and off-loading capability such as a shiftable or extendible load supporting platform or other mechanism for purposes of facilitating the loading or transfer of goods to and from the vehicle. In the present invention, load discharging and charging mechanisms are provided which enable the vehicle to both discharge a load placed thereon as well as to load goods which are placed within the storage bins of the system.

With particular reference to FIGS. 6 and 24, two automatic loading and off-loading assemblies 200 are shown each of which includes a reciprocally movably load engagement arm 201 that is mounted within a guide channel 202 that is secured to the upper surface 70 of the vehicle and between the opposing load supporting guide rails 76. A somewhat U-shaped catch 204 is pivotally mounted at the outer end portion 205 of each of the load engagement arms. The catches 204 are designed to be selectively engaged to the brackets 26 mounted beneath the movable pallets 31 being transported by the vehicles of the automated material handling system of the invention. Each of the catches is mounted on an electrical operated swivel unit 203 mounted within each load engagement arm and which swivel unit pivots the associated catch through a ninety degree angle from a normal upright position, as shown in FIG. 6, to a lowered position as shown in FIG. 24, so that the catch may pass adjacent to a bracket of an adjacent pallet without interference.

When the load engagement arm 201 is to be extended to engage a bracket of an adjacent pallet, the swivel unit will cause the catch to rotate to the low profile or horizontal orientation so that the catch passes beneath the bracket on an adjacent pallet. Thereafter, the swivel unit indexes the catch so as to engage on opposite sides of the bracket such that the pallet will be pulled toward the guide rails on the vehicle when the load engagement arm 201 is moved inwardly of its guide channel 202 by power provided by an electric motor 206. The motors 206 are reversible drive motors that have output drive shafts connected through gear boxes 207 to drive gears, not shown, mounted within the guide channels 202 that drive continuous chains mounted within the guide channels that are connected to the engagement arms 201. Other drive connections may be used such as a gear racks associated with each engagement arm that are driven by gears driven by the motors 206.

In the embodiment of the invention shown in FIG. 6, the two engagement arms 201/201' extend across the width of the upper surface of the transfer vehicle with one arm being deployable to one side of the vehicle and the other being deployable to the other side. In the embodiment shown in FIG. 25, two sets of shorter loading and off-loading assemblies 200' are provided on the vehicle with one set cooperating to load and off-load from one side of the vehicle with the other set cooperating to load and off-load from the opposite side of the vehicle. The components of the system are identified by the same reference numbers with a prime symbol. In the operation of the shorter assemblies, a first of the engagement arms 201' extends outwardly to initially engage a bracket associated with a pallet to be loaded onto the rails of the vehicle. After the catch is engaged, the engagement arm 201' pulls the pallet approximately half way onto the vehicle. At this point the catch 204' of the first engagement arm is released while the catch of the second engagement arm, which has now been extended, engages the bracket and the second engagement arm pulls the pallet completely onto the vehicle. Off-loading of the pallet from the vehicle into a storage bin or other receiver is accomplished in a reverse manner.

When a pallet has been loaded onto a transfer vehicle, a catch 204/204' remains engaged with the mounting bracket of the pallet and thereby functions as a lock that prevents any adverse movement of the pallet relative to the transport vehicle. When it is necessary to unload or discharge a pallet from one of the transfer vehicles, the load extension arms 201/201' are fully extended, after which, the catches are rotated to their low profile position and are thus disengaged relative to the pallet.

The self-loading and off-loading feature described above may be achieved by other types of mechanical devices. Further, such devices may be incorporated within all of the embodiments of the invention disclosed herein.

Figure 26:
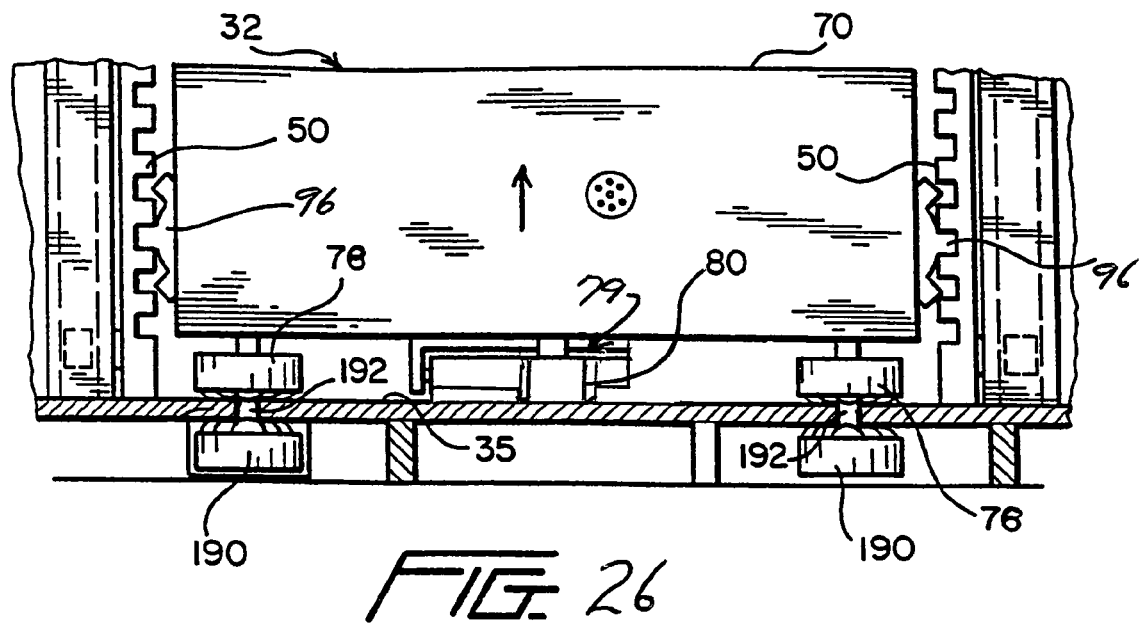
FIG. 26 is a partial view of a floor guidance system in accordance with the invention.

As previously described with respect to FIG. 1, the systems of the invention may include guide channels, especially in storage room areas, for guiding the load transfer vehicles. In FIG. 1, the guide channels are shown at 38 as being generally linear channels which intersect perpendicularly with respect to one another. With reference to FIG. 26, a transfer vehicle 32, as previously described, is shown as entering into one of the trunks from a grid type system. The vehicle is modified in a channel guide system to include secondary roller sets 190 which depend from the primary roller sets 78 associated with the transfer vehicle. The secondary roller sets 190 are connected by struts or posts 192 to the primary rollers sets 78. In the modified version of the invention shown, the transfer vehicle is moved longitudinally relative to the open channels 38 which are formed in the surface of the lower storage level 35. The secondary roller sets 190 are positioned to roll against the lower surface of the deck or floor 35 and thus prevent any possible tilting of the transfer vehicle as it moves throughout the storage area. By manipulation of the drive wheel 80, the transfer vehicle can move longitudinally in four directions along the channels 38. Different configurations or layouts of the channels may also be utilized in accordance with the teachings of the present invention.

It should be noted that as opposed to the omni-directional wheels described for moving the vehicle along horizontal surfaces, propulsion across surfaces could be performed utilizing a pair of continuous tracks which would be independently driven by separate motors such that the tracks may be driven in reverse directions with respect to one another. Such motors may be reversible electric motors which are powered by the power supply carried within the vehicle or electrical raceway. In this manner, the vehicle is omni-directional being able to move in substantially 360°. The tracks are preferably formed of a material such as rubber which provides sufficient frictional traction to prevent any sliding or slipping of the vehicle relative to a travel surface, including along metallic flooring. The tracks may be enlarged and separated at a greater distance from one another so as to do away with the support rollers.

Figure 27:
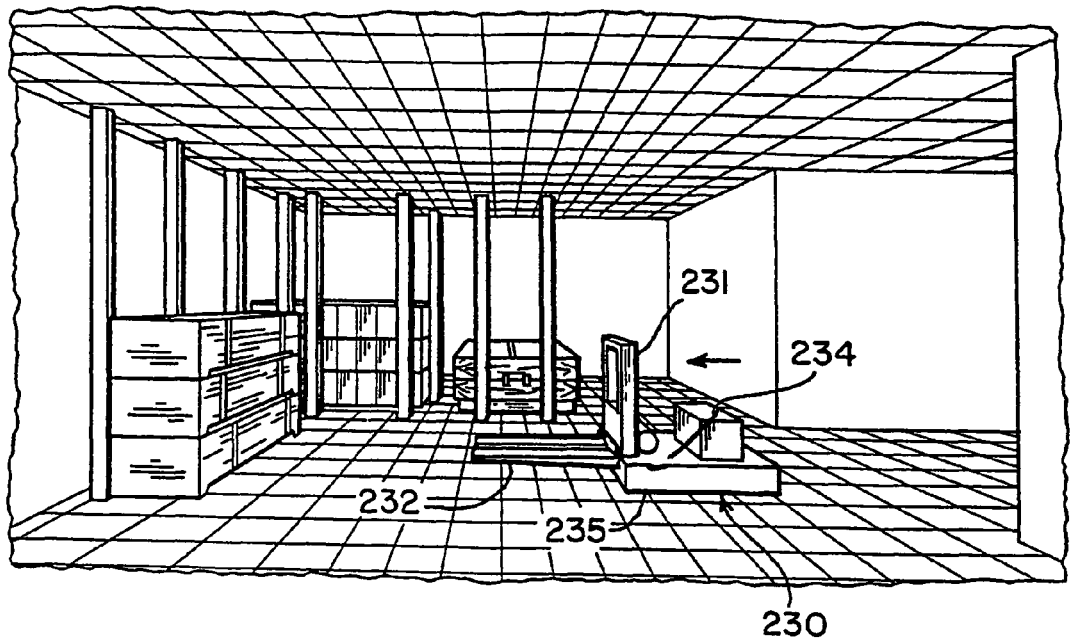
FIG. 27 is an illustrational view of a storage area in accordance with the teachings of the present invention showing a further embodiment of load transfer vehicle.
Figure 28:
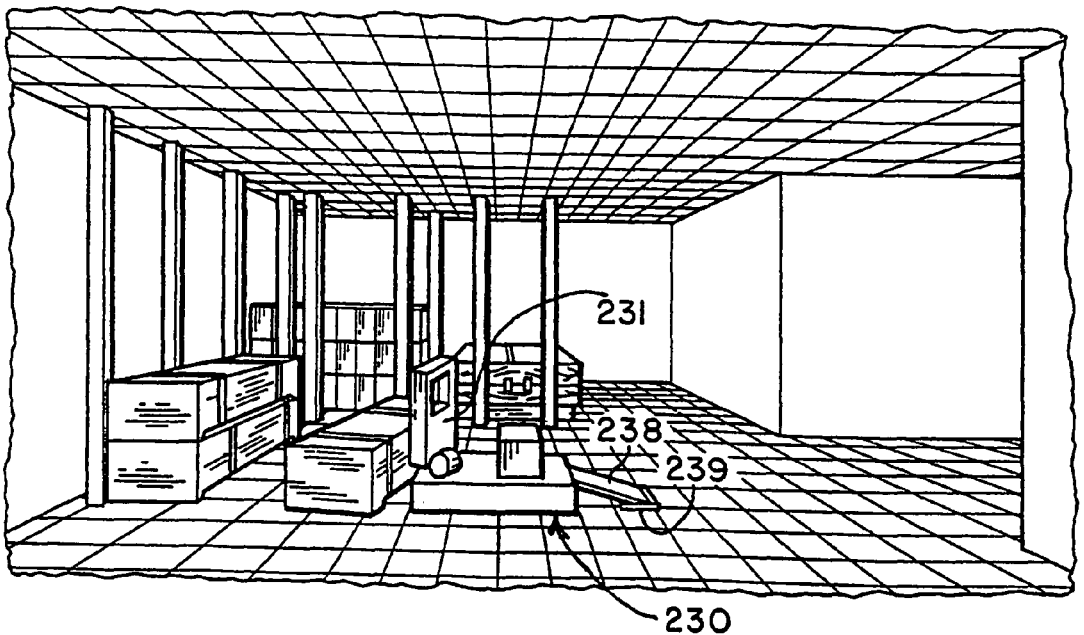
FIG. 28 is an illustrational view of the vehicle and storage system shown in FIG. 23 showing the vehicle lifting a load and deploying a counter-balance outrigger.

With reference to FIGS. 27 and 28, another embodiment of the invention is disclosed in greater detail. In this embodiment, the load transport vehicle has a main body which is substantially similar to that of the first described embodiment shown at 32 in the drawing figures. In this respect, the vehicle includes first primary drive elements 79 for propelling the vehicle across a level or deck surface, a second rotatable pinions for maneuvering the vehicle within one of the trunks of the system and, in some cases, third drive mechanisms for use in entering and exiting the trunks of the system. The load transfer vehicle 230 is provided with a forklift mast 231 on which a pair of generally L-shaped forks 232 are mounted so as to vertically adjustable.

In FIGS. 27 and 28, the load transfer vehicle 230 is shown in a storage area similar to that shown at 35 in FIG. 1. The vehicle may be movable within a track system as described with respect to the embodiments in FIG. 26 or may be freely movable with respect to the supporting surfaces.

A pivotable upper platform 234 of the vehicle is carried by and is pivotal relative to a body 235 so as to be movable with respect to the main body of the vehicle. The platform 234 is pivotable about vertical axis in a 360° motion relative to the body.

The forklift transport vehicle 230 is shown in the drawing figures as also including an extendible counter balance outrigger 238 at the rear thereof having a foot for engagement with a surface as shown at 239. The foot 239 may include an electro-magnetic member for anchoring to a metallic floor such that magnetic attraction can be selectively applied through appropriate controls (not shown). When not in use, the outrigger may be pivoted or retracted relative to the body of the vehicle. When a heavy load is to be lifted, the outrigger is deployed as shown in FIG. 28 as a counter-balance.

In addition to the concept of a magnetic hold down for the transfer vehicles of the invention, pneumatic devices may be used to securely anchor the vehicles to a support surface such as a deck of a ship as shown in FIGS. 29 and 30. In these instances, a vacuum pump 300 would be mounted within the vehicle and be connected to a suitable source of power. A vacuum hose 302 extends from the pump to a suction head 304 pivotally mounted at the end of outrigger 305. The outrigger is deployable outwardly of the vehicle in such a manner that the suction head is cooperatively seated against the support surface. A gasket or seal 306 surrounds the air inlet openings 308 into the suction head and ensures an air tight contact between the suction head and the support surface. By creating a vacuum or partial vacuum at the suction head, the outrigger will be securely connected to the support surface in such a manner that the vehicle can not be accidental moved as the ship pitches and rolls under rough sea conditions.

Figure 31:
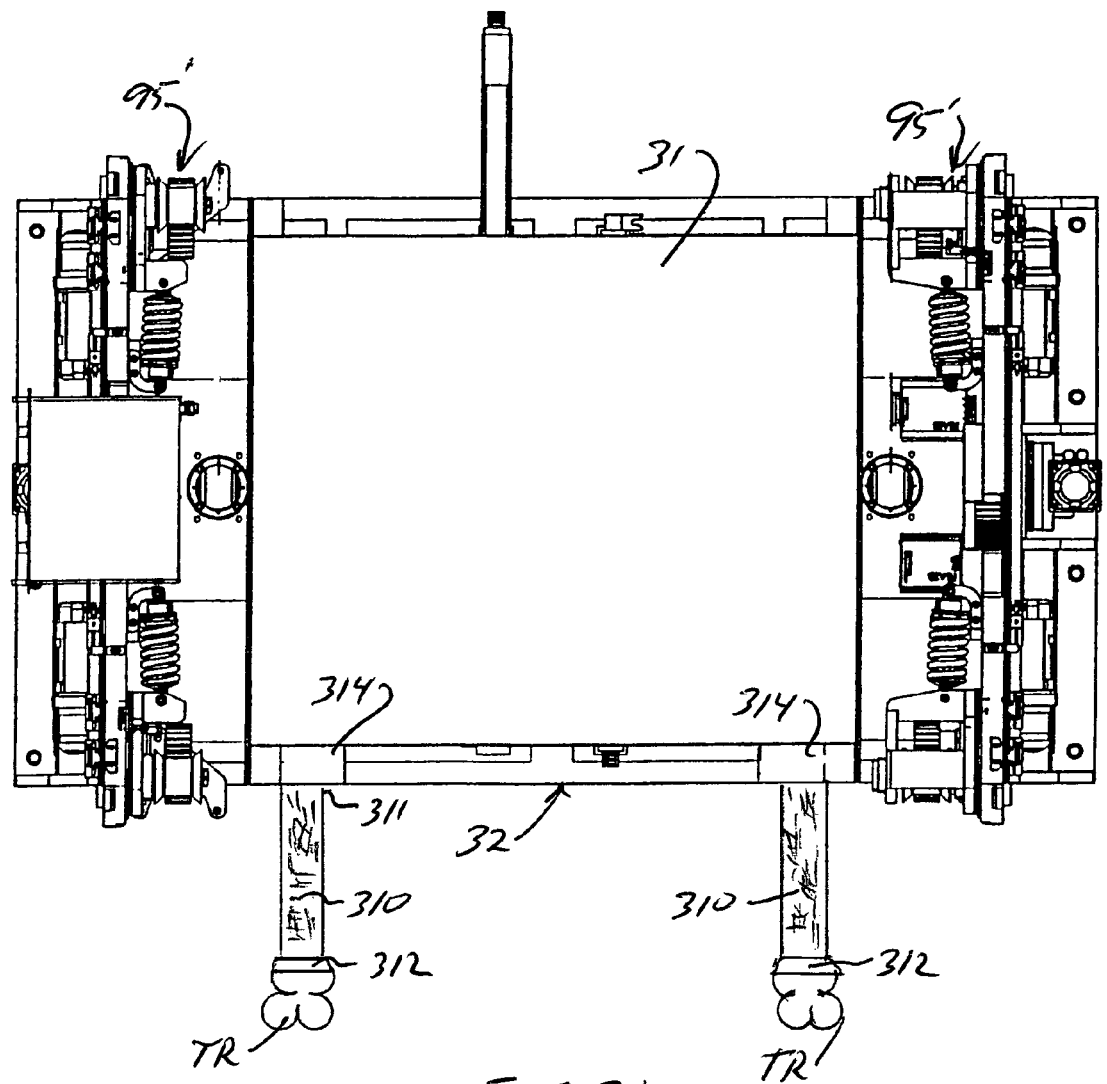
FIG. 31 is an illustrational view of one of the vehicles showing the vehicle deploying a strap lock counter-balance system.

With specific reference to FIG. 31, an alternate form of hold down device is shown that is adapted to be used with the conventional clover leaf tie down recesses "TR" used on the decks of transport and military ships. In this embodiment, hold down straps 310 are secured at one end 311 to the vehicle while the outer ends are mounted to locking members 312 of a size to be cooperatively received and anchored within the recesses "TR". To permit for tension adjustment of the anchoring straps, the straps may be mounted on electric winches or winding drums 314 that are powered by suitable electrical drive motors connected to the vehicle's power system. As opposed to the flexible tie down straps, more rigid outriggers could be used having the cooperatively configured locking member3 312 mounted thereto.

By way of example only, the transfer units or vehicles 32 of the invention may be used to self-load and off-load and transport and maneuver standard shipping pallets and containers including two 40"×48" pallets, one MHE 96"×44" container, two JMIC 54"×44" containers, or one Quadcon 58"×96" container.

In some embodiments of the invention, the transfer units or vehicles 32 are compactly constructed between their upper and lower surfaces in such a manner that up to five vehicles may be stored within one trunk and between two vertically adjacent levels or decks when not in use.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

We claim:

1. An automated material transfer and storage system for moving articles along and between a plurality of vertically spaced levels, the system comprising:
    at least one vertical trunk extending between and communicating the plurality of spaced levels, said at least one trunk defining an open trunk including access openings at said plurality of levels and having opposite sides;
    generally opposing pairs of spaced rack means extending vertically along at least portions of said opposite sides;
    a load transfer vehicle having a body defining an article support surface, said body having opposite ends and opposite sides, at least one first drive assembly having first drive means for mobilizing said load transfer vehicle horizontally across the plurality of levels, and a plurality of second drive assemblies each having second drive means engageable with said first rack means for moving said load transfer vehicle vertically within said at least one vertical trunk;
    a plurality of first deployment mechanisms for selectively extending said plurality of second drive means from first positions in spaced relationship from the rack means to a second oppositely deployed positions spaced outwardly relative to said body so as to mesh with said rack means such that said plurality of second drive means may be selectively moved to the first positions in spaced relationship from the rack means to thereby permit said load transfer vehicle to exit the at least one trunk through one of the access openings;
    means for supplying power to said transfer vehicle and connected to said at least one first and second drive means; and
    control means carried by said transfer vehicle for controlling said at least one first and plurality of second drive means so as to maneuver said load transfer vehicle along said plurality of levels and within said at least one trunk whereby an article supported on said load transfer vehicle can be automatically transported from point-to-point along and between said plurality of levels and within said at least one trunk.

2. The automated material transfer and storage system of claim 1 wherein said means for supplying power includes an inductive power transfer system including conductors extending within at least portions of said at least one trunk, and a plurality of electrical pickup devices carried by said load transfer vehicle for receiving power from said conductors, and each electrical pickup being mounted to second deployment mechanisms for selectively extending said electrical pickup devices from said body of the transfer vehicle to alignment with said conductors of the inductive power transfer system or to move said electrical pickup devices from energy exchange with the conductors of the inductive power transfer system.

3. The automated material transfer and storage system of claim 2 wherein said means for supplying power also includes at least one battery carried by said transfer vehicle.

4. The automated material transfer and storage system of claim 1 wherein said first drive means includes at least one drive wheel means pivotally mounted to said transfer vehicle, said means for providing power being connected to drive said at least one drive wheel means and steering means for selectively rotating said at least one drive wheel means such that said load transfer vehicle can be maneuvered omni-directionally relative to said plurality of levels.

5. The automated material transfer and storage systems of claim 1 wherein each second drive means includes a driven gear that is selectively engageable with teeth of an opposing one of said rack means, each of said second drive assemblies including means for mounting each of said second drive means to a separate movable support connected to one of said first deployment mechanisms so as to be selectively movable between the first position spaced from an opposing rack means and the second position engaging said opposing rack means, and each of said second drive means including a gear drive means for rotating said driven gear to thereby propel said load transfer vehicle vertically along said rack means, and means for communicating at least one of said one of said first deployment mechanisms and said second drive means to said control means.

6. The automated material transfer and storage system of claim 5 wherein each pair of opposing rack means extend along opposite and opposing corners of said at least one trunk, said first deployment mechanisms moving said separate movable supports generally diagonally with respect to four corners of said body of said load transfer vehicle such that said driven gear means are deployed diagonally relative to engage an opposing rack means in said second position.

7. The automated material transfer and storage system of claim 6 including a plurality of third drive means mount to said load transfer vehicle for automatically loading and off-loading said load transfer vehicle relative to said at least one trunk, each of said third drive means including a driven member, a second deployment means for selectively deploying said driven members outwardly relative to said body of said load transfer vehicle and inwardly toward said body, and means for driving each of said driven members.

8. The automated material transfer and storage system of claim 7 wherein said at least one vehicle support platform includes at least two spaced and generally opposing platform segments that extend within said at least one trunk adjacent said access openings that are engageable by said driven members of said third drive means when deployed outwardly relative to said body of said load transfer vehicle.

9. The automated material transfer and storage system of claim 5 wherein each pair of opposing rack means extend along opposite sides of said at least one trunk spaced inwardly relative to corners of said at least one trunk, said first deployment mechanisms moving said separate movable supports generally outwardly in opposing relationship with one another from said body of said load transfer vehicle such that said driven gears are deployed to engage an opposing rack means in said second position.

10. The load transfer vehicle of claim 9 including a plurality of third drive means mounted to said load transfer vehicle for automatically loading and off-loading said load transfer vehicle relative to said at least one trunk, each of said third drive means including a driven member, a second deployment means for selectively deploying said driven members outwardly relative to said body of said load transfer vehicle and inwardly toward said body, and means for driving each of said driven members.

11. The load transfer vehicle of claim 9 wherein said first deployment mechanism includes a first common drive element for simultaneously moving said movable supports for a first pair of oppositely oriented driven gears and a second common drive element for simultaneously moving said movable supports for a second pair of oppositely oriented driven gears.

12. The automated material transfer and storage systems of claim 5 wherein said second drive means includes guide means mounted adjacent each of said driven gear means for aligning said driven gear means relative to said rack means.

13. The automated material transfer and storage system of claim 1 including at least one vehicle support platform positioned within the at least one vertical trunk at each of the access openings.

14. The automated material transfer and storage system of claim 1 wherein said vehicle support platform is pivotally mounted to selectively close or open at least one of said access openings, said support platform being movable from a first position permitting passage of said load support vehicle within the trunk to a second position to selectively support said load transfer vehicle within said at least one trunk so as to be movable with through said at least one access opening by said at least one first drive means.

15. The automated material transfer and storage system of claim 1 including article handling means carried by said body of said load transfer vehicle for automatically loading and off-loading articles onto said body of said load transfer vehicle.

16. The automated material transfer and storage system of claim 15 including stabilization means carried by said load transfer vehicle for selectively engaging one of said plurality of levels to prevent tilting of said load transfer vehicle when an article is extended from said body of said transfer vehicle.

17. The automated material transfer and storage system of claim 16 wherein said stabilization means includes at least one suction head, means carried by said load transfer means to deploy said at least one suction head such that said at least one suction head is engageable with a support surface, means for sealing said at least one suction head to the support surface when a vacuum is applied therebetween, and means for applying at least a partial vacuum between said at least one suction head and the support surface.

18. The automated material transfer and storage system of claim 15 wherein said article handling means includes at least one catch member, means for selectively deploying said at least one catch member from said body of said load transfer vehicle to engage an article to be loaded and for selectively retracting said at least one catch to pull the article onto said body of said load transfer vehicle.

19. The automated material transfer and storage system of claim 1 wherein an upper end of said at least one trunk is positioned at an uppermost one of said plurality of levels, a cover means for normally covering an upper opening into said at least one trunk for permitting said transfer vehicle to ingress/egress at said upper end of said at least one trunk relative to said uppermost level, said cover means including a pair of doors having upper surfaces which are co-extensive with said uppermost level when in a first position covering said at least one trunk, means for pivotally mounting said doors relative to said uppermost level, supplemental rack means provided on a lower surface of said doors such that said supplemental rack means are aligned with said rack means of said at least one trunk when said doors are in a second raised position, and means for supporting said doors in said second raised position.

20. A load transfer vehicle for distributing articles with respect to a plurality of vertically spaced levels which levels are communicated by at least one vertical trunk which defines an open shaft including access openings at said plurality of levels and having two pair of spaced opposing gear racks extending vertically within the open shaft, the load transfer vehicle comprising;
  a body including an article support surface, at least one first drive means for mobilizing said load transfer vehicle across the plurality of levels,
  at least four second drive means each including a driven gear means, each of said second drive means including first deployment means for selectively deploying said driven gear means thereof outwardly relative to the vehicle to engage with one of said gear racks for moving the load transfer vehicle vertically within said at least one vertical trunk and for withdrawing said driven gear means from engagement with said gear racks,
  plurality of third drive means for automatically moving the transfer vehicle into or out of the at least one trunk, each of said third drive means including at least one third drive member and second deployment means for extending and retracting said at least one third drive member outwardly of and toward said body, respectively,
  means for supplying power to said first, second and third drive means, said means for supplying power carried by the load transfer vehicle; and
  control means carried by said transfer vehicle for controlling said first and second and drive means so as to move the transfer vehicle along the plurality of levels and within the at least one trunk whereby an article supported on said article support surface can be transported from point-to-point along and between the plurality of levels and within the at least one trunk.

21. The load transfer vehicle of claims 20 wherein each of said third drive means includes means for automatically retracting said third drive member as the vehicle is being moved out of the at least one trunk as the third drive member approaches one of the gear racks, and means for powering said third drive means to rotate in uniform rotational velocity and in a common direction.

22. The load transfer vehicle of claim 21 including means carried by said body for automatically loading and discharging articles from said article support surface.

23. The load transfer vehicle of claim 21 including anchor means deployable relative to said body for securing said transfer vehicle relative to one of the plurality of levels.

24. The load transfer vehicle of claim 20 including means carried by said body for automatically loading and discharging articles from said article support surface.

25. The load transfer vehicle of claim 20 including anchor means deployable relative to said body for securing said transfer vehicle relative to one of the plurality of levels.

* * * * *